(12) United States Patent
Shirao et al.

(10) Patent No.: US 8,532,886 B1
(45) Date of Patent: Sep. 10, 2013

(54) WORK VEHICLE AND CONTROL METHOD FOR WORK VEHICLE

(75) Inventors: Atsushi Shirao, Komatsu (JP); Masanori Ikari, Komatsu (JP); Isao Ueno, Nomi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/809,400

(22) PCT Filed: May 9, 2012

(86) PCT No.: PCT/JP2012/061881
§ 371 (c)(1),
(2), (4) Date: Jan. 9, 2013

(30) Foreign Application Priority Data

Mar. 27, 2012 (JP) ................................. 2012-071608

(51) Int. Cl.
*B60K 17/00* (2006.01)
*B60K 17/10* (2006.01)

(52) U.S. Cl.
USPC ........................................... 701/50; 180/307

(58) Field of Classification Search
USPC .................. 701/50; 180/53.2, 305, 306, 307; 74/731.1
See application file for complete search history.

(56) References Cited

U.S. PATENT DOCUMENTS

| | | | |
|---|---|---|---|
| 6,272,950 B1 * | 8/2001 | Braun et al. | 74/731.1 |
| 6,688,418 B2 * | 2/2004 | Bohrer | 180/305 |
| 7,841,442 B2 * | 11/2010 | Berg et al. | 180/305 |
| 8,386,136 B2 * | 2/2013 | Shirao et al. | 701/50 |
| 8,418,798 B2 * | 4/2013 | Mori et al. | 180/307 |
| 2004/0211614 A1 * | 10/2004 | Matsuyama | 180/305 |

FOREIGN PATENT DOCUMENTS

| | | |
|---|---|---|
| JP | 3-134371 A | 6/1991 |
| JP | 5-39863 A | 2/1993 |
| JP | 5-42843 A | 2/1993 |
| JP | 2004-144254 A | 5/2004 |

* cited by examiner

*Primary Examiner* — Joseph Rocca
(74) *Attorney, Agent, or Firm* — Global IP Counselors, LLP

(57) ABSTRACT

A storage section stores inching characteristic information. The inching characteristic information defines a relationship between an inching operation quantity and an inching characteristic value. The inching characteristic value is a value dependent on pilot pressure that is reduced through inching control. A computing section references the inching characteristic information to thereby compute, from the inching operation quantity detected by the inching operation quantity detector, a command value to the pilot pressure control valve. In the inching characteristic information, a rate of lowering the inching characteristic value when the inching operation quantity is within a first range is greater than a rate of lowering the inching characteristic value when the inching operation quantity is within a second range greater than the first range.

16 Claims, 11 Drawing Sheets

US 8,532,886 B1

WORK VEHICLE AND CONTROL METHOD FOR WORK VEHICLE

CROSS-REFERENCE TO RELATED APPLICATIONS

This application claims priority to Japanese Patent Application No. 2012-071608 filed on Mar. 27, 2012, the disclosure of which is hereby incorporated herein by reference in its entirety.

TECHNICAL FIELD

The present invention relates to a work vehicle, and to a control method for a work vehicle.

BACKGROUND ART

Certain work vehicles are equipped with a so-called Hydro Static Transmission (HST). In an HST work vehicle, a hydraulic pump is driven by an engine, and a traveling motion hydraulic motor is driven by hydraulic fluid discharged from the hydraulic pump. Traveling motion of the work vehicle is thereby brought about. In an HST work vehicle of this type, the vehicle speed and traction force can be controlled through control of the engine speed, the pump displacement of the hydraulic pump, the motor displacement of the traveling motion hydraulic motor, and the like (see Japan Patent Laid-open Patent Publication JP-A-2004-144254).

In a work vehicle such as the aforedescribed, it is desirable to be able to lower the vehicle speed only, without lowering the engine speed. The reason is that, in a case in which, for example, a work implement is to be driven immediately after lowering the vehicle speed, when the engine speed has been lowered, it will take more time to increase the driving force of the work implement. For this reason, certain work vehicles are equipped with an inching pedal. The operator operates the inching pedal in order to reduce the vehicle speed. When the inching pedal is operated, depending on the quantity of depression of the inching pedal, the pilot pressure to the pump displacement control cylinder that controls the tilting angle of the hydraulic pump is reduced. In so doing, the pump displacement is reduced. As a result, the vehicle speed can be lowered without lowering the engine speed.

SUMMARY

FIG. 4 shows modification of pump displacement-drive circuit pressure characteristics, depending on the pilot pressure to the pump displacement control cylinder. The pump displacement-drive circuit pressure characteristics define a relationship between pump displacement and drive circuit pressure. The drive circuit pressure is the pressure of the hydraulic fluid that is supplied to the traveling motion hydraulic motor by the hydraulic pump. In FIG. 4, at lesser pilot pressure, the pump displacement-drive circuit pressure characteristics are modified from L11 towards L16. In other words, the pump displacement-drive circuit pressure characteristics are modified such that the less the pilot pressure is, the lesser the pump displacement becomes with respect to the drive circuit pressure. In so doing, the pump displacement can be reduced.

Let it be assumed, for example, that through depression of the inching pedal by the operator, the pump displacement-drive circuit pressure characteristics are modified from L11 to L12. At this time, when the drive circuit pressure is P1, the pump displacement remains unchanged at maximum displacement Qmax, despite the pump displacement-drive circuit pressure characteristics having been modified from L11 to L12. When the pump displacement-drive circuit pressure characteristics are then modified to L13 through further depression of the inching pedal by the operator, the pump displacement is reduced to a value that depends on the drive circuit pressure P1. The vehicle speed is reduced as a result. In this way, when the drive circuit pressure is low, the vehicle speed is not reduced unless the operator substantially depresses the inching pedal.

The drive circuit pressure is also less at lesser travel loads. For example, as shown in FIG. 4, when the drive circuit pressure is at P2, the pump displacement remains unchanged at maximum displacement Qmax, despite the pump displacement-drive circuit pressure characteristics being modified from L11 to L12. Even when the pump displacement-drive circuit pressure characteristics are modified to L13 through further depression of the inching pedal by the operator, the pump displacement remains unchanged at maximum displacement Qmax. When the pump displacement-drive circuit pressure characteristics are then modified to L14 through even greater depression of the inching pedal by the operator, the pump displacement is reduced to a value that depends on the drive circuit pressure P2. In this way, when the travel load is less, reduction in vehicle speed does not begin until the inching pedal is depressed even more greatly. A consequent problem is that at lesser travel loads, the dead region of the inching pedal becomes quite large.

In order to make the dead region of the inching pedal smaller, it would be conceivable to increase the quantity of decrease in pilot pressure with respect to the quantity of depression of the inching pedal. However, in this case, when the quantity of depression of the inching pedal is sufficient to escape the dead region, the quantity of decrease in the vehicle speed with respect to the quantity of depression of the inching pedal will be excessive. Therefore, lowering of the operation performance of the inching pedal becomes a problem.

It is an object of the present invention to provide a work vehicle and a control method for a work vehicle, whereby the dead region of an inching operation member can be made smaller, while also curtailing lowering of the operation performance of the inching operation member.

The work vehicle according to a first aspect of the present invention includes an engine; a hydraulic pump; a traveling motion hydraulic motor; a pump displacement control cylinder, a pilot hydraulic pressure source; a pilot pressure control valve; an inching operation member; an inching operation quantity detector, a storage section; and a computing section. The hydraulic pump is driven by the engine. The traveling motion hydraulic motor is driven by hydraulic fluid discharged from the hydraulic pump. The pump displacement control cylinder is configured to change a pump displacement of the hydraulic pump by changing a tilting angle of the hydraulic pump. The pilot hydraulic pressure source is configured to supply hydraulic fluid for driving the pump displacement control cylinder. The pilot pressure control valve is configured to control a pilot pressure, which is a pressure of the hydraulic fluid supplied to the pump displacement control cylinder from the pilot hydraulic pressure source. The inching operation member is configured to be operated in order to indicate that inching control be executed. The inching control is control for bringing about a reduction in the pump displacement by reducing the pilot pressure. The inching operation quantity detector is configured to detect an inching operation quantity. The inching operation quantity is an operation quantity of the inching operation member. The storage section is configured to store inching characteristic information. The inching characteristic information defines a relationship between the inching operation quantity and an inching characteristic value. The inching characteristic value is a value corresponding to the pilot pressure which is reduced through the inching control. The computing section references the inching characteristic information to thereby compute, from the inching operation quantity detected by the inching operation quantity detector, a command value to the pilot pressure control valve. In the inching characteristic information, a rate of lowering the inching characteristic value when the inching operation quantity is within a first range is greater than a rate of lowering the inching characteristic value when the inching operation quantity is within a second range greater than the first range.

The work vehicle according to a second aspect of the present invention is a work vehicle according to the first aspect, further provided with a determination parameter detector. The determination parameter detector is configured to detect a determination parameter for determining whether the work vehicle is in a state of work or a state of traveling motion. The inching characteristic information defines a relationship between the inching operation quantity and the inching characteristic value, in a manner dependent on the determination parameter.

The work vehicle according to a third aspect of the present invention is a work vehicle according to the second aspect, wherein the computing section determines whether the work vehicle is in the state of work or the state of traveling motion on the basis of the determination parameter. The inching characteristic information includes first inching characteristic information and second inching characteristic information. The first inching characteristic information is referenced when the work vehicle is determined to be in the state of work. The second inching characteristic information is referenced when the work vehicle is determined to be in the state of traveling motion. The second inching characteristic information defines a different relationship between the inching operation quantity and the inching characteristic value from that of the first inching characteristic information.

The work vehicle according to a fourth aspect of the present invention is a work vehicle according to the third aspect, wherein the inching characteristic value defined by the second inching characteristic information is less than the inching characteristic value defined by the first inching characteristic information.

The work vehicle according to a fifth aspect of the present invention is a work vehicle according to the third aspect, wherein, within the first range, the inching characteristic value defined by the second inching characteristic information is identical to the inching characteristic value defined by the first inching characteristic information. In the second range, the inching characteristic value defined by the second inching characteristic information is less than the inching characteristic value defined by the first inching characteristic information.

The work vehicle according to a sixth aspect of the present invention is a work vehicle according to the third aspect, wherein the inching operation quantity at which the inching characteristic value begins to decrease in a manner dependent on increase in the inching operation quantity in the second inching characteristic information is identical to the inching operation quantity at which the inching characteristic value begins to decrease in a manner dependent on increase in the inching operation quantity in the first inching characteristic information.

The work vehicle according to a seventh aspect of the present invention is a work vehicle according to the third aspect, further includes a brake device for braking the work vehicle. The inching operation member also functions as an operation member of the brake device. The brake device is configured such that an increase in braking force in a manner dependent on increase in the inching operation quantity is initiated at a predetermined brake-initiating operation quantity. In the first inching characteristic information, the inching characteristic value reaches a minimum value when the inching operation quantity equals a first inching upper limit value. In the second inching characteristic information, the inching characteristic value reaches a minimum value when the inching operation quantity equals a second inching upper limit value. The second inching upper limit value is less than the first inching upper limit value. The brake-initiating operation quantity is at least less than the first inching upper limit value.

The work vehicle according to an eighth aspect of the present invention is a work vehicle according to the seventh aspect, wherein the brake-initiating operation quantity coincides with the second inching upper limit value.

The work vehicle according to a ninth aspect of the present invention is a work vehicle according to any of the second to eighth aspects, further includes an accelerator operation member for setting a target rotation speed of the engine. The determination parameter includes at least an operation quantity of the accelerator operation member.

The work vehicle according to a tenth aspect of the present invention is a work vehicle according to any of the second to eighth aspects, wherein the determination parameter includes at least a vehicle speed.

The work vehicle according to an eleventh aspect of the present invention is a work vehicle according to any of the third to eighth aspects, further includes an accelerator operation member for setting a target rotation speed of the engine. The determination parameter is an operation quantity of the accelerator operation member. The computing section references the second inching characteristic information when the operation quantity of the accelerator operation member is less than a predetermined value. The computing section references the first inching characteristic information when the operation quantity of the accelerator operation member is equal to or greater than the predetermined value.

The work vehicle according to a twelfth aspect of the present invention is a work vehicle according to any of the third to eighth aspects, further includes an accelerator operation member for setting a target rotation speed of the engine. The determination parameter is an operation quantity of the accelerator operation member. The computing section references the second inching characteristic information when the operation quantity of the accelerator operation member is less than a first value. The computing section references the first inching characteristic information when the operation quantity of the accelerator operation member is equal to or greater than a second value that is greater than the first value. The computing section maintains the current inching characteristic information when the operation quantity of the accelerator operation member is equal to or greater than the first value but less than the second value.

The work vehicle according to a thirteenth aspect of the present invention is a work vehicle according to any of the third to eighth aspects, further includes an accelerator operation member for setting a target rotation speed of the engine. The determination parameter is an operation quantity of the accelerator operation member. The computing section references the second inching characteristic information when the operation quantity of the accelerator operation member is less than a first value. The computing section references the first inching characteristic information when the operation quantity of the accelerator operation member is equal to or greater than a second value that is greater than the first value. The computing section computes the inching characteristic value by interpolating from the first inching characteristic information and the second inching characteristic information when the operation quantity of the accelerator operation member is equal to or greater than the first value but less than the second value.

The work vehicle according to a fourteenth aspect of the present invention is a work vehicle according to any of the third to eighth aspects, wherein the determination parameter is a vehicle speed. The computing section references the first inching characteristic information when the vehicle speed is less than a predetermined value. The computing section references the second inching characteristic information when the vehicle speed is equal to or greater than the predetermined value.

The work vehicle according to a fifteenth aspect of the present invention is a work vehicle according to any of the third to eighth aspects, wherein the determination parameter is a vehicle speed. The computing section references the first inching characteristic information when the vehicle speed is less than a first value. The computing section references the second inching characteristic information when the vehicle speed is equal to or greater than a second value that is greater than the first value. The computing section maintains the current inching characteristic information when the vehicle speed is equal to or greater than the first value but less than the second value.

The work vehicle according to a sixteenth aspect of the present invention is a work vehicle according to any of the third to eighth aspects, wherein the determination parameter is a vehicle speed. The computing section references the first inching characteristic information when the vehicle speed is less than a first value. The computing section references the second inching characteristic information when the vehicle speed is equal to or greater than a second value that is greater than the first value. The computing section computes the inching characteristic value by interpolating from the first inching characteristic information and the second inching characteristic information when the vehicle speed is equal to or greater than the first value but less than the second value.

A control method according to a seventeenth aspect of the present invention is a control method for a work vehicle. The work vehicle includes: an engine; a hydraulic pump; a traveling motion hydraulic motor, a pump displacement control cylinder; a pilot hydraulic pressure source; a pilot pressure control valve; and an inching operation member. The hydraulic pump is driven by the engine. The traveling motion hydraulic motor is driven by hydraulic fluid discharged from the hydraulic pump. The pump displacement control cylinder is configured to change a pump displacement of the hydraulic pump by changing a tilting angle of the hydraulic pump. The pilot hydraulic pressure source is configured to supply hydraulic fluid for driving the pump displacement control cylinder. The pilot pressure control valve is configured to control a pilot pressure, which is a pressure of the hydraulic fluid supplied to the pump displacement control cylinder from the pilot hydraulic pressure source. The inching operation member is configured to be operated in order to indicate execution of inching control. The inching control is control for bringing about a reduction in the pump displacement by reducing the pilot pressure. The control method according to the present aspect includes the following steps. A first step is detecting an inching operation quantity which is an operation quantity of the inching operation member. A second step is computing a command value to the pilot pressure control valve based on the detected inching operation quantity by referencing inching characteristic information. The inching characteristic information defines a relationship between the inching operation quantity and an inching characteristic value. The inching characteristic value is a value corresponding to the pilot pressure which is reduced through the inching control. In the inching characteristic information, a rate of lowering the inching characteristic value when the inching operation quantity is within a first range is greater than a rate of lowering the inching characteristic value when the inching operation quantity is within a second range greater than the first range.

With the work vehicle according to the first aspect of the present invention, the pump displacement is reduced to a greater extent when the inching operation quantity is within the first range than when the inching operation quantity is within the second range. In so doing, the dead region of the inching operation member can be made smaller. Moreover, the pump displacement is reduced to a lesser extent when the inching operation quantity is within the second range than when the inching operation quantity is within the first range. In so doing, lowering of the operation performance of the inching operation member can be curtailed.

With the work vehicle according to the second aspect of the present invention, the inching characteristic information defines a relationship between inching operation quantities and inching characteristic values, depending on determination parameters. The travel motion load differs depending on whether the vehicle is in the state of traveling motion or in the state of work. Consequently, by computing inching characteristic values on the basis of determination parameters, the pump displacement can be reduced appropriately, according to differences in the state of the work vehicle.

With the work vehicle according to the third aspect of the present invention, first inching characteristic information is referenced when the work vehicle is in the state of work. Second inching characteristic information is referenced when the work vehicle is in the state of traveling motion. In so doing, the pump displacement can be reduced appropriately, according to differences in the state of the work vehicle.

With the work vehicle according to the fourth aspect of the present invention, the pump displacement is reduced to a greater extent when the work vehicle is in the state of traveling motion than when the work vehicle is in the state of work. In so doing, the vehicle speed can be rapidly reduced through the inching control during traveling motion. Moreover, excessive lowering of vehicle speed can be curtailed during work.

With the work vehicle according to the fifth aspect of the present invention, when the inching operation quantity is within the first range, the dead region of the inching operation member when in the state of work can be made smaller, in the same manner as when in the state of traveling motion. Moreover, when the inching operation quantity is within the second range, the pump displacement is reduced to a greater extent when the work vehicle is in the state of traveling motion than when in the state of work. In so doing, the vehicle speed can be reduced rapidly through the inching control during traveling motion.

With the work vehicle according to the sixth aspect of the present invention, the pump displacement begins to be lowered at identical inching operation quantities, both during travel motion and during work. Consequently, the feel of operation of the inching member is identical both during travel motion and during work, and the operation performance can be improved.

With the work vehicle according to the seventh aspect of the present invention, braking by the brake device during work is initiated before the inching operation quantity reaches the first inching upper limit value. In some instances, the inching operation member is operated for the purpose of lowering traction force during work. For example, during excavation work, when the force pushing the work implement into the earth is too strong, the work implement can no longer be lifted. In such cases, the work implement can be lifted by weakening the traction force. However, when braking force is not being generated by the brake device at the time that traction force is weakened through operation of the inching operation member, it is possible for the work vehicle to be thrust backward due to retroaction. With the work vehicle according to the present aspect, the state at the time that traction force is weakened through operation of the inching operation member is one in which the brake device is generating braking force. Therefore, backward thrusting of the work vehicle due to retroaction can be prevented.

With the work vehicle according to the eighth aspect of the present invention, braking force during traveling motion begins to be generated by the brake device when the inching operation quantity has reached the second inching upper limit value. Therefore, backward thrusting of the work vehicle during uphill traveling motion, for example, can be prevented. Moreover, as compared with the case in which the brake-initiating operation quantity is less than the second inching upper limit value, it is possible to reduce the range of inching operation quantities within which the inching control according to the first inching characteristic information and braking force by the brake device are employed concomitantly. Specifically, it is possible to reduce the range of inching operation quantities within which traveling motion at low speed during work takes place through the inching control in the state in which braking force is generated by the brake device. In so doing, energy loss can be reduced.

With the work vehicle according to the ninth aspect of the present invention, it can be determined whether the work vehicle is in the state of work or in the state of traveling motion on the basis of at least the operation quantity of the accelerator operation member.

With the work vehicle according to the tenth aspect of the present invention, it can be determined whether the work vehicle is in the state of work or in the state of traveling motion on the basis of at least the vehicle speed.

With the work vehicle according to the eleventh aspect of the present invention, it can be determined whether the work vehicle is in the state of work or in the state of traveling motion by comparing the operation quantity of the accelerator operation member to a predetermined value.

With the work vehicle according to the twelfth aspect of the present invention, hysteresis can be introduced into the determination of the state of the work vehicle. Repeated switching between the first inching characteristic information and the second inching characteristic information within a brief time span can thereby be prevented.

With the work vehicle according to the thirteenth aspect of the present invention, the pump displacement is reduced on the basis of intermediate inching characteristic information lying between the first inching characteristic information and the second inching characteristic information, depending on the operation quantity of the accelerator operation member. In so doing, the pump displacement can be reduced in a more appropriate fashion, depending on the state of the work vehicle.

With the work vehicle according to the fourteenth aspect of the present invention, it can be determined whether the work vehicle is in the state of work or in the state of traveling motion by comparing the vehicle speed to a predetermined value.

With the work vehicle according to the fifteenth aspect of the present invention, hysteresis can be introduced into the determination of the state of the work vehicle. In so doing, repeated switching between the first inching characteristic information and the second inching characteristic information within a brief time span can be prevented.

With the work vehicle according to the sixteenth aspect of the present invention, the pump displacement is reduced on the basis of intermediate inching characteristic information lying between the first inching characteristic information and the second inching characteristic information, depending on the vehicle speed. In so doing, the pump displacement can be reduced in a more appropriate fashion, depending on the state of the work vehicle.

With the work vehicle according to the seventeenth aspect of the present invention, the pump displacement is reduced to a greater extent when the inching operation quantity is within the first range than when the inching operation quantity is within the second range. Moreover, the pump displacement is reduced to a lesser extent when the inching operation quantity is within the second range than when the inching operation quantity is within the first range. In so doing, the dead region of the inching operation member can be made smaller, and lowering of the operation performance of the inching operation member can be curtailed.

DESCRIPTION OF EMBODIMENTS

A work vehicle 50 according to an embodiment of the present invention is described below employing the drawings.

Figure 1:
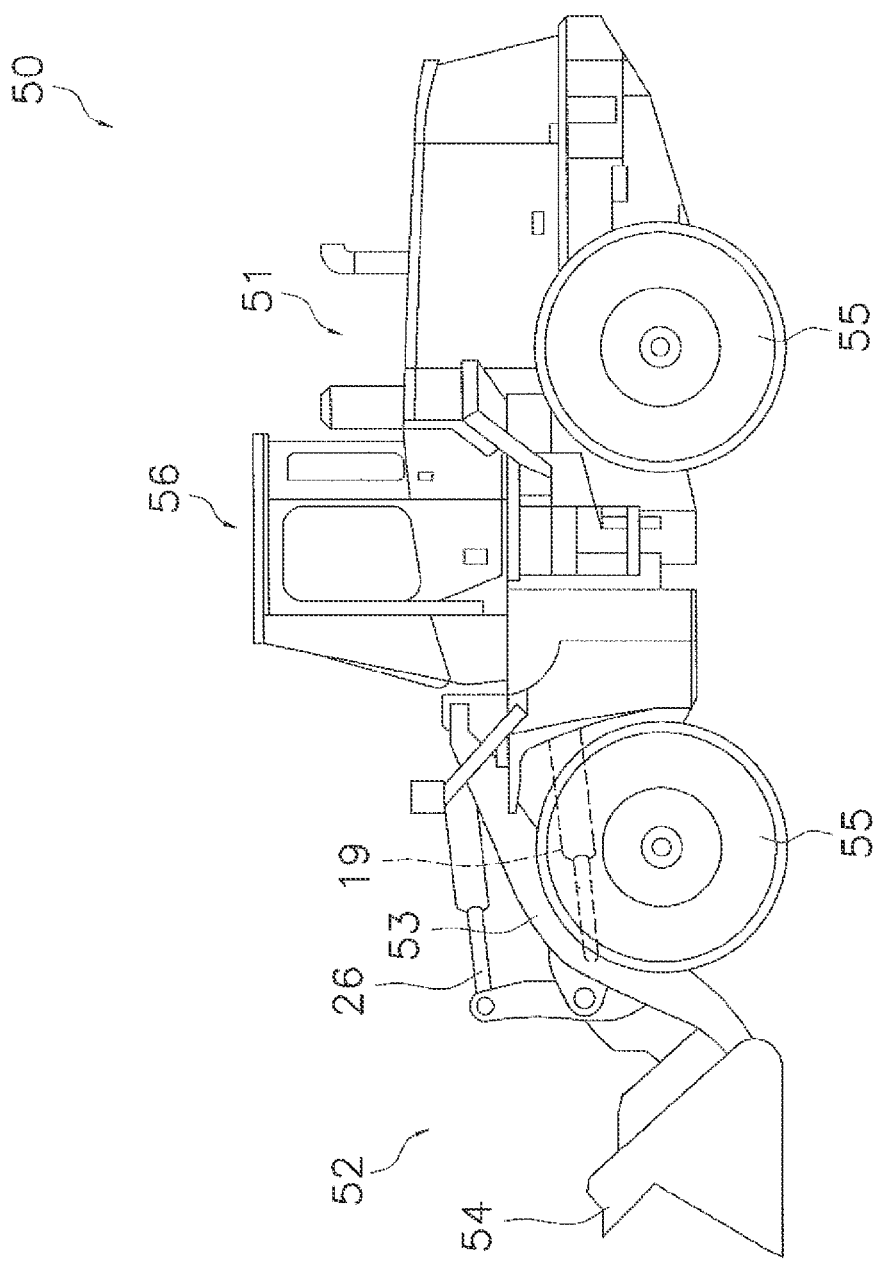
FIG. 1 is a side view of a work vehicle according to an embodiment of the present invention.

FIG. 1 is a side view of the work vehicle 50. The work vehicle 50 is a wheel loader. The work vehicle 50 includes a vehicle body 51, a work implement 52, a plurality of tires 55, and a cab 56. The work implement 52 is mounted to the front section of the vehicle body 51. The work implement 52 includes a boom 53, a bucket 54, a lift cylinder 19, and a bucket cylinder 26. The boom 53 is a member for the purpose of lifting up the bucket 54. The boom 53 is driven by the lift cylinder 19. The bucket 54 is attached to the distal end of the boom 53. The bucket 54 is dumped and tilted by the bucket cylinder 26. The cab 56 is disposed on the vehicle body 51.

Figure 2:
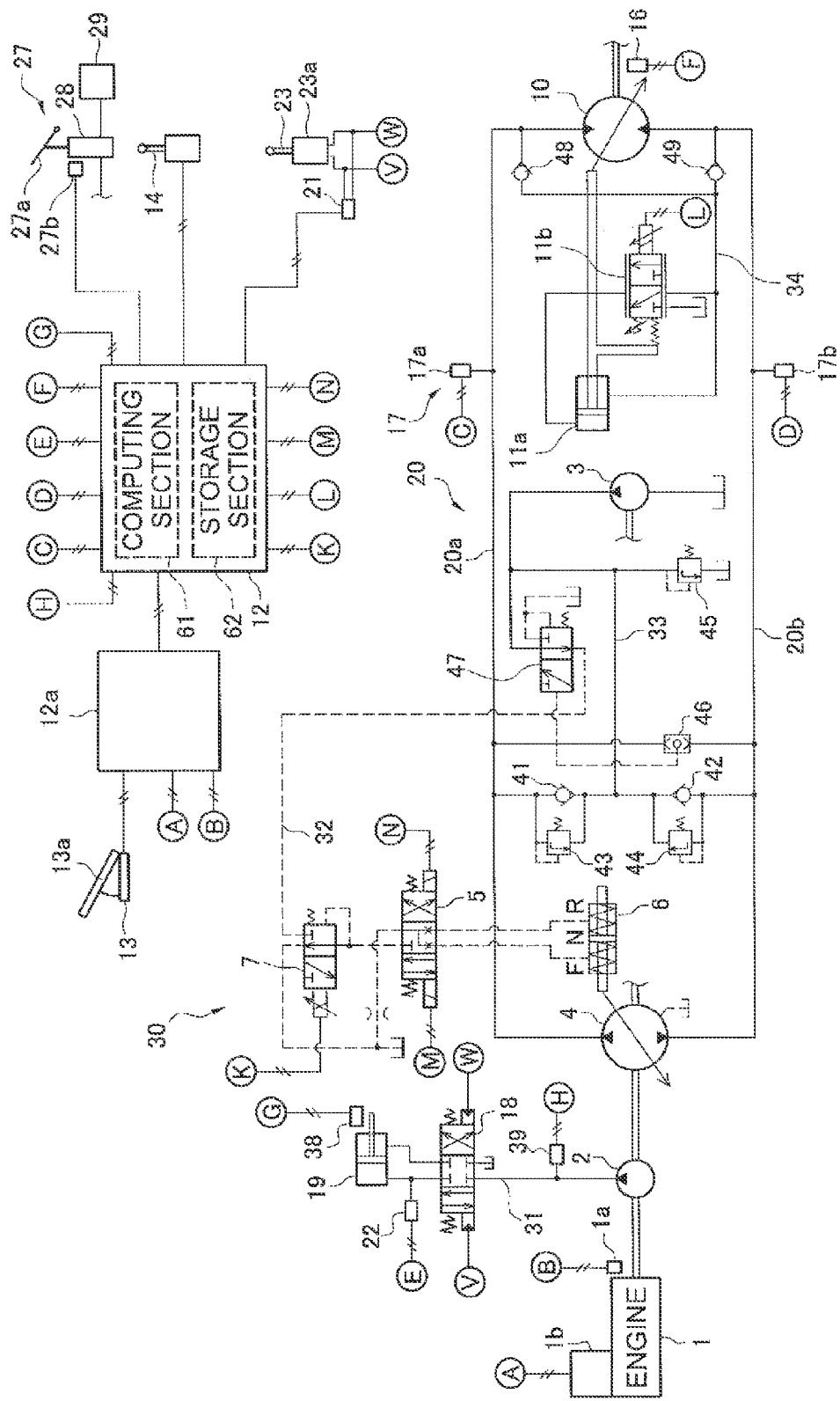
FIG. 2 is a block diagram showing the constitution of a hydraulic drive mechanism equipped to the work vehicle.

FIG. 2 is a block diagram showing the constitution of a hydraulic drive mechanism 30 equipped to the work vehicle 50. The hydraulic drive mechanism 30 principally includes an engine 1, a first hydraulic pump 4, a second hydraulic pump 2, a charge pump 3, a traveling motion hydraulic motor 10, an engine controller 12a, a vehicle body controller 12, and a drive hydraulic circuit 20. In the hydraulic drive mechanism 30, the first hydraulic pump 4 is driven by the engine 1 and thereby discharges hydraulic fluid. The traveling motion hydraulic motor 10 is driven by the hydraulic fluid discharged from the first hydraulic pump 4. The traveling motion hydraulic motor 10 in turn drives rotation of the above-mentioned tires 55, creating traveling motion of the work vehicle 50. Specifically, in the hydraulic drive mechanism 30, there is adopted a so-called 1-pump, 1-motor HST system.

The engine 1 is a diesel engine. Output torque generated by the engine 1 is transmitted to the second hydraulic pump 2, the charge pump 3, the first hydraulic pump 4, and the like. The hydraulic drive mechanism 30 is furnished with an engine speed detector 1a for detecting the actual rotation speed of the engine 1. A fuel injection device 1b is connected to the engine 1. By controlling the fuel injection device 1b, the engine controller 12a, discussed below, controls the rotation speed and the output torque (hereinafter termed "engine torque") of the engine 1.

The first hydraulic pump 4, driven by the engine 1, thereby discharges hydraulic fluid. The first hydraulic pump 4 is a variable-displacement hydraulic pump. The hydraulic fluid discharged from the first hydraulic pump 4 is sent through the drive hydraulic circuit 20 to the traveling motion hydraulic motor 10. Specifically, the drive hydraulic circuit 20 includes a first drive circuit 20a and a second drive circuit 20b. By supplying hydraulic fluid from the first hydraulic pump 4 to the traveling motion hydraulic motor 10 via the first drive circuit 20a, the traveling motion hydraulic motor 10 is driven in one direction (for example, the direction of forward advance). By supplying hydraulic fluid from the first hydraulic pump 4 to the traveling motion hydraulic motor 10 via the second drive circuit 20b, the traveling motion hydraulic motor 10 is driven in the other direction (for example, the direction of rearward advance).

The drive hydraulic circuit 20 is furnished with a drive circuit pressure detector 17. The drive circuit pressure detector 17 detects the pressure (hereinafter termed the "drive circuit pressure") of the hydraulic fluid supplied to the traveling motion hydraulic motor 10 via the first drive circuit 20a or the second drive circuit 20b. Specifically, the drive circuit pressure detector 17 includes a first drive circuit pressure sensor 17a and a second drive circuit pressure sensor 17b. The first drive circuit pressure sensor 17a detects the hydraulic pressure of the first drive circuit 20a. The second drive circuit pressure sensor 17b detects the hydraulic pressure of the second drive circuit 20b. The first drive circuit pressure sensor 17a and the second drive circuit pressure sensor 17b send detection signals to the vehicle body controller 12. An FR switching section 5 and a pump displacement control cylinder 6 for controlling the discharge direction of the first hydraulic pump 4 are connected to the first hydraulic pump 4.

The FR switching section 5 is an electromagnetic control valve that switches the direction of supply of hydraulic fluid to the pump displacement control cylinder 6 on the basis of a control signal from the vehicle body controller 12. The FR switching section 5 switches the discharge direction of the first hydraulic pump 4 by switching the direction of supply of hydraulic fluid to the pump displacement control cylinder 6. Specifically, the FR switching section 5 switches the discharge direction of the first hydraulic pump 4 between discharge to the first drive circuit 20a and discharge to the second drive circuit 20b. The driving direction of the traveling motion hydraulic motor 10 is changed thereby. The pump displacement control cylinder 6 is driven by being supplied with hydraulic fluid via a pump pilot circuit 32. The pump displacement control cylinder 6 thereby changes the tilting angle of the first hydraulic pump 4. In so doing, the pump displacement control cylinder 6 changes the displacement of the first hydraulic pump 4 (hereinafter termed simply "pump displacement").

A pilot pressure control valve 7 is disposed in the pump pilot circuit 32. The pilot pressure control valve 7 is an electromagnetic control valve controlled on the basis of a control signal from the vehicle body controller 12. The pilot pressure control valve 7 controls the pressure of the hydraulic fluid supplied to the pump displacement control cylinder 6 via the pump pilot circuit 32. Specifically, the tilting angle of the first hydraulic pump 4 is adjusted by changing the pressure of the hydraulic fluid supplied to the pump displacement control cylinder 6 (hereinafter termed "pump pilot pressure") on the basis of a control signal from the vehicle body controller 12.

The pump pilot circuit 32 is connected via a cutoff valve 47 to a charge circuit 33 and a hydraulic fluid tank. A pilot port of the cutoff valve 47 is connected, via a shuttle valve 46, to the first drive circuit 20a and the second drive circuit 20b. The shuttle valve 46 introduces the hydraulic pressure of either the first drive circuit 20a or the second drive circuit 20b, whichever is greater, to the pilot port of the cutoff valve 47. In other words, the drive circuit pressure is applied to the pilot port of the cutoff valve 47. When the drive circuit pressure is lower than a predetermined cutoff pressure, the cutoff valve 47 places the charge circuit 33 and the pump pilot circuit 32 in communication with each other. In so doing, the hydraulic fluid is supplied from the charge circuit 33 to the pump pilot circuit 32. When the drive circuit pressure is equal to or greater than the predetermined cutoff pressure, the cutoff valve 47 places the pump pilot circuit 32 in communication with the hydraulic fluid tank, whereupon hydraulic fluid escapes into the hydraulic fluid tank from the pump pilot circuit 32. In so doing, the hydraulic pressure of the pump pilot circuit 32, specifically, the pump pilot pressure, is lowered, thereby reducing the pump displacement, and curtailing a rise in drive circuit pressure.

The charge pump 3 is a pump that, driven by the engine 1, supplies hydraulic fluid to the drive hydraulic circuit 20. The charge pump 3 is connected to the charge circuit 33. The charge pump 3 supplies hydraulic fluid to the pump pilot circuit 32 via the charge circuit 33. The charge pump 3 is one example of a pilot hydraulic pressure source that supplies hydraulic fluid for driving the pump displacement control cylinder 6. The charge circuit 33 is connected to the first drive circuit 20a via a first check valve 41. The first check valve 41 allows flow of hydraulic fluid from the charge circuit 33 to the first drive circuit 20a, but restricts flow of hydraulic fluid from the first drive circuit 20a to the charge circuit 33. The charge circuit 33 is also connected to the second drive circuit 20b via a second check valve 42. The second check valve 42 allows flow of hydraulic fluid from the charge circuit 33 to the second drive circuit 20b, but restricts flow of hydraulic fluid from the second drive circuit 20b to the charge circuit 33. The charge circuit 33 is further connected to the first drive circuit 20a via a first relief valve 43. The first relief valve 43 opens when the hydraulic pressure of the first drive circuit 20a is greater than a predetermined pressure. The charge circuit 33 is also connected to the second drive circuit 20b via a second relief valve 44. The second relief valve 44 opens when the hydraulic pressure of the second drive circuit 20b is greater than a predetermined pressure.

The second hydraulic pump 2 is driven by the engine 1. Hydraulic fluid discharged from the second hydraulic pump 2 is supplied to the lift cylinder 19 via a work machine hydraulic circuit 31. The work machine 52 is driven thereby. The discharge pressure of the second hydraulic pump 2 is detected by a discharge pressure sensor 39. The discharge pressure sensor 39 sends a detection signal to the vehicle body controller 12. The work machine hydraulic circuit 31 is furnished with a work machine control valve 18. The work machine control valve 18 is driven in a manner dependent on an operation quantity of a work machine operation member 23. The work machine control valve 18 controls the flow rate of hydraulic fluid supplied to the lift cylinder 19, in a manner dependent on the pilot pressure that is applied to the pilot port. The pilot pressure that is applied to the pilot port of the work machine control valve 18 is controlled by a pilot valve 23a of the work implement operation member 23. The pilot valve 23a applies a pilot pressure that is dependent on the operation quantity of the work machine operation member 23, to the pilot port of the work machine control valve 18. The lift cylinder 19 is thereby controlled in a manner dependent on the operation quantity of the work machine operation member 23. The pilot pressure that is applied to the pilot port of the work machine control valve 18 is detected by a PPC pressure sensor 21. The pressure of the hydraulic fluid supplied to the lift cylinder 19 is detected by a boom pressure sensor 22. The PPC pressure sensor 21 and the boom pressure sensor 22 send detection signals to the vehicle body controller 12. The lift cylinder 19 is furnished with a boom angle detector 38. The boom angle detector 38 detects the boom angle. The boom angle detector 38 is a sensor that detects the rotation angle of the boom 53. Alternatively, it is acceptable for the boom angle detector 38 to detect the stroke quantity of the lift cylinder 19, and to compute the rotation angle of the boom 53 from the stroke quantity. The boom angle detector 38 sends a detection signal to the vehicle body controller 12. In the same manner as the lift cylinder 19, the bucket cylinder 26 is controlled by a control valve; however, this has been omitted from the illustration in FIG. 2.

The traveling motion hydraulic motor 10 is a variable-displacement hydraulic motor. The traveling motion hydraulic motor 10 is driven by hydraulic fluid discharged from the first hydraulic pump 4, and produces driving force for the purpose of traveling motion. The traveling motion hydraulic motor 10 is furnished with a motor cylinder 11a and a motor displacement control section 11b. The motor cylinder 11a changes the tilting angle of the traveling motion hydraulic motor 10. The motor displacement control section 11b is an electromagnetic control valve for control on the basis of a control signal from the vehicle body controller 12. The motor displacement control section 11b controls the motor cylinder 11a on the basis of a control signal from the vehicle body controller 12. The motor displacement control section 11b thereby changes the displacement of the traveling motion hydraulic motor 10 (hereinafter termed the "motor displacement"). The motor cylinder 11a and the motor displacement control section 11b are connected to a motor pilot circuit 34. The motor pilot circuit 34 is connected to the first drive circuit 20a via a check valve 48. The check valve 48 allows flow of hydraulic fluid from the first drive circuit 20a to the motor pilot circuit 34, but restricts flow of hydraulic fluid from the motor pilot circuit 34 to the first drive circuit 20a. The motor pilot circuit 34 is connected to the second drive circuit 20b via a check valve 49. The check valve 49 allows flow of hydraulic fluid from the second drive circuit 20b to the motor pilot circuit 34, but restricts flow of hydraulic fluid from the motor pilot circuit 34 to the second drive circuit 20b. By virtue of the check valves 48 and 49, hydraulic fluid at the hydraulic pressure of the first drive circuit 20a or the second drive circuit 20b, whichever is greater, specifically, at the drive circuit pressure, is supplied to the motor pilot circuit 34. The motor displacement control section 11b switches the direction of supply of hydraulic fluid from the motor pilot circuit 34 to the motor cylinder 11a, as well as the supply flow rate thereof, on the basis of a control signal from the vehicle body controller 12. The vehicle body controller 12 can thereby freely change the motor displacement. An upper limit displacement and lower limit displacement for the traveling motion hydraulic motor 10 can be freely established as well.

The hydraulic drive mechanism 30 is moreover furnished with a vehicle speed detector 16. The vehicle speed detector 16 detects the vehicle speed. The vehicle speed detector 16 sends a detection signal to the vehicle body controller 12. The vehicle speed detector 16 detects the vehicle speed by detecting the rotation speed of a tire drive axle, for example.

The work vehicle 50 is provided with an accelerator operation member 13a, a forward/rearward advance switching operation member 14, and an inching operation section 27.

The accelerator operation member 13a is a member by which an operator establishes a target rotation speed of the engine 1. The accelerator operation member 13a may be, for example, an accelerator pedal for operation by the operator. The accelerator operation member 13a is connected to an accelerator operation quantity detector 13. The accelerator operation quantity detector 13 is configured by a potentiometer or the like. The accelerator operation quantity detector 13 sends a detection signal that shows the operation quantity of the accelerator operation member 13a (hereinafter termed the "accelerator operation quantity") to the engine controller 12a. The accelerator operation quantity is expressed, for example, as a percentage, assigning a value of 100% to a state in which the accelerator operation member 13a is operated to the fully open position. By adjusting the accelerator operation quantity, the operator can control the rotation speed of the engine 1.

The forward/rearward advance switching operation member 14 is operated by the operator and switched between a forward advance position, a rearward advance position, and a neutral position. The forward/rearward advance switching operation member 14 sends the vehicle body controller 12 a detection signal that shows the position of the forward/rearward advance switching operation member 14. Through operation of the forward/rearward advance switching operation member 14, the operator can switch the work vehicle 50 between forward advance and rearward advance.

The inching control section 27 includes an inching operation member 27a and an inching operation quantity detector 27b. The inching operation member 27a is operated by the operator for the purpose of indicating that inching control be executed. Inching control reduces the pump displacement by reducing the pump pilot pressure. The vehicle speed is lowered thereby. The inching operation member 27a is a pedal, for example. The inching operation member 27a also functions so as to perform inching operation functions and braking operation functions, as will be discussed below. The inching operation quantity detector 27b detects the operation quantity of the inching operation member 27a (hereinafter termed "inching operation quantity"), and transmits a detection signal to the vehicle body controller 12. The inching operation quantity is, for example, the depression angle of an inching pedal, where 0 degrees is assigned to the state in which the inching pedal is not being depressed. When the inching operation member 27a is operated, the vehicle body controller 12 controls the pilot pressure control valve 7 on the basis of the detection signal from the inching operation quantity detector 27b. The vehicle body controller 12 lowers the hydraulic pressure of the pump pilot circuit 32 in a manner dependent on the operation quantity of the inching operation member 27a. The pump pilot pressure to the first hydraulic pump 4 is lowered thereby, reducing the pump displacement of the first hydraulic pump 4. As a result, the drive circuit pressure is lowered, and the speed of the traveling motion hydraulic motor 10 is lowered. The inching operation section 27 is used, for example, when it is desired to raise the rotation speed of the engine 1, while curtailing the rise in the speed of traveling motion. Specifically, when the rotation speed of the engine 1 rises due to operation of the accelerator operation member 13a, the hydraulic pressure of the pump pilot circuit 32 rises as well. At this time, the rise in hydraulic pressure of the pump pilot circuit 32 can be controlled through operation of the inching operation member 27a. Increase in the pump displacement is curtailed thereby, and a rise in the speed of the traveling motion hydraulic motor 10 can be curtailed. In other words, the inching operation member 27a is operated for the purpose of reducing the vehicle speed without lowering the engine speed. Inching control is described in detail below.

Moreover, a brake valve 28 is linked to the inching operation member 27a. The brake valve 28 controls the supply of hydraulic fluid to a brake device 29. The inching operation member 27a also functions as an operation member of the brake device 29. Until the operation quantity of the inching operation member 27a reaches a predetermined brake-initiating operation quantity, discussed below, only the above-mentioned inching operation is performed on the basis of the detection signal from the inching operation quantity detector 27b. Then, when the operation quantity of the inching operation member 27a reaches the brake-initiating operation quantity, operation of the brake valve 28 is initiated, and braking force is thereby generated in the brake device 29. As long as the operation quantity of the inching operation member 27a is equal to or greater than a predetermined quantity, the braking force of the brake device 29 is controlled in a manner dependent on the operation quantity of the inching operation member 27a.

Figure 3:
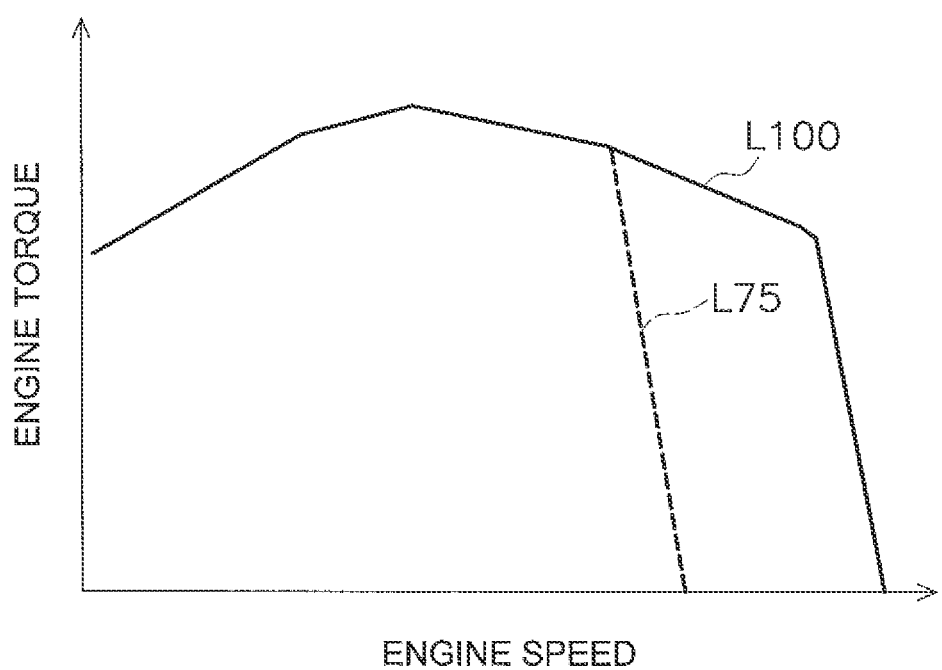
FIG. 3 is a diagram showing output torque curves of an engine.

The engine controller 12a is an electronic control section having a computing device such as a CPU or the like, memory of various kinds, and the like. The engine controller 12a controls the engine 1 in such a way as to obtain an established target rotation speed. FIG. 3 shows output torque curves of the engine 1. The output torque curves of the engine 1 show the relationship of the rotation speed of the engine 1, and the magnitude of the maximum engine torque that the engine 1 can output at each speed. In FIG. 3, the solid line L100 shows the engine output torque curve when the accelerator operation quantity is 100%. This engine output torque curve corresponds, for example, to the rated or maximum power output of the engine 1. An accelerator operation quantity of 100% signifies a state in which the acceleration operation member 13a is being operated at the maximum. The broken line L75 shows the engine output torque curve when the accelerator operation quantity is 75%. The engine controller 12a controls the output of the engine 1 in such a way that the engine torque is equal to or less than the engine output torque curve. This control of output of the engine 1 is performed, for example, by controlling the upper limit value of the quantity of fuel injected to the engine 1.

The vehicle body controller 12 includes a computing section 61 and a storage section 62. The computing section 61 is configured by a computing device such as a CPU or the like. The storage section 62 is configured by memory of various kinds, such as RAM, ROM, or the like, and/or by storage devices of various kinds, such as hard disks, flash memory, or the like. The vehicle body controller 12 electronically controls the control valves on the basis of detection signals from the detection sections, and thereby controls the pump displacement and the motor displacement.

Figure 4:
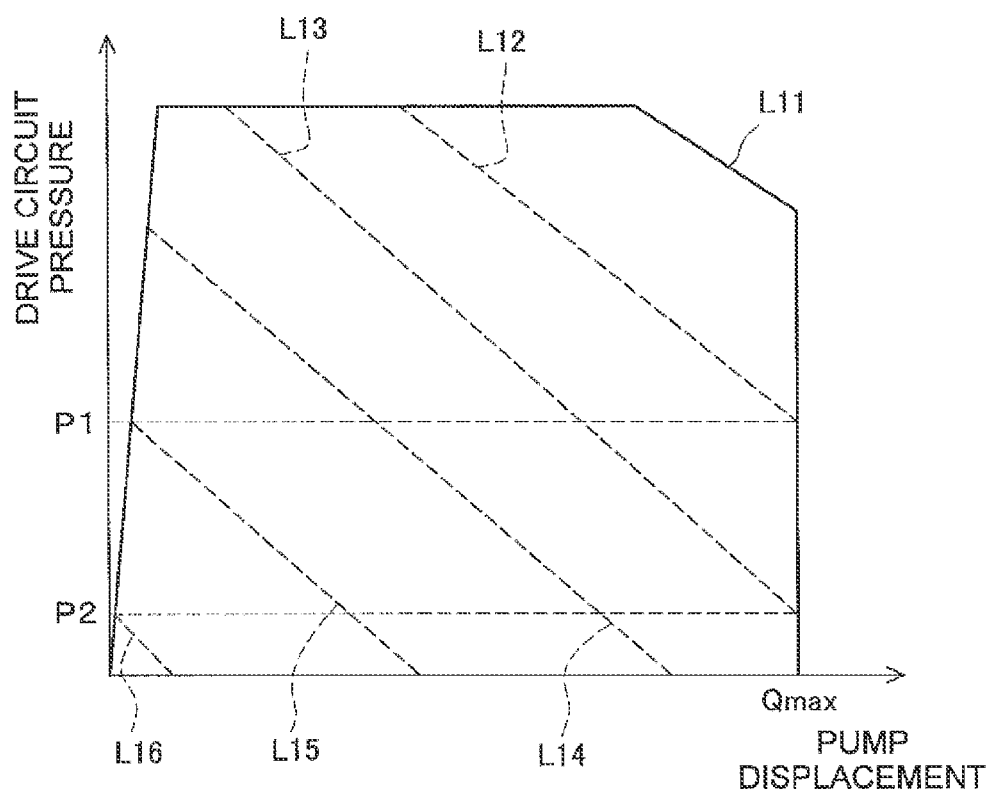
FIG. 4 is a diagram showing an example of pump displacement-drive circuit pressure characteristics.

Specifically, the vehicle body controller 12 outputs a command signal to the pilot pressure control valve 7 on the basis of the engine speed detected by the engine speed detector 1a. A relationship between pump displacement and drive circuit pressure is defined thereby. FIG. 4 shows an example of pump displacement-drive circuit pressure characteristics. Pump displacement-drive circuit pressure characteristics show a relationship between pump displacement and drive circuit pressure. In the drawing, L11 to L16 are lines showing pump displacement-drive circuit pressure characteristics changed in a manner dependent on engine rotation speed. Specifically, by controlling the pressure of the pilot pressure control valve 7 via the vehicle body controller 12 on the basis of engine speed, the pump displacement-drive circuit pressure characteristics are changed from L11 to L16. The pump displacement is thereby controlled to a magnitude corresponding to the engine speed and the drive circuit pressure.

The vehicle body controller 12 processes the detection signals from the engine speed detector 1a and the drive circuit pressure detector 17, and outputs a motor displacement command signal to the motor displacement control section 11b. In this instance, the vehicle body controller 12 references motor displacement-drive circuit pressure characteristics stored in the vehicle body controller 12, and establishes a motor displacement from the engine speed value and the drive circuit pressure value. The vehicle body controller 12 outputs to the motor displacement control section 11b a tilting angle change command corresponding to this established motor displacement.

Figure 5:
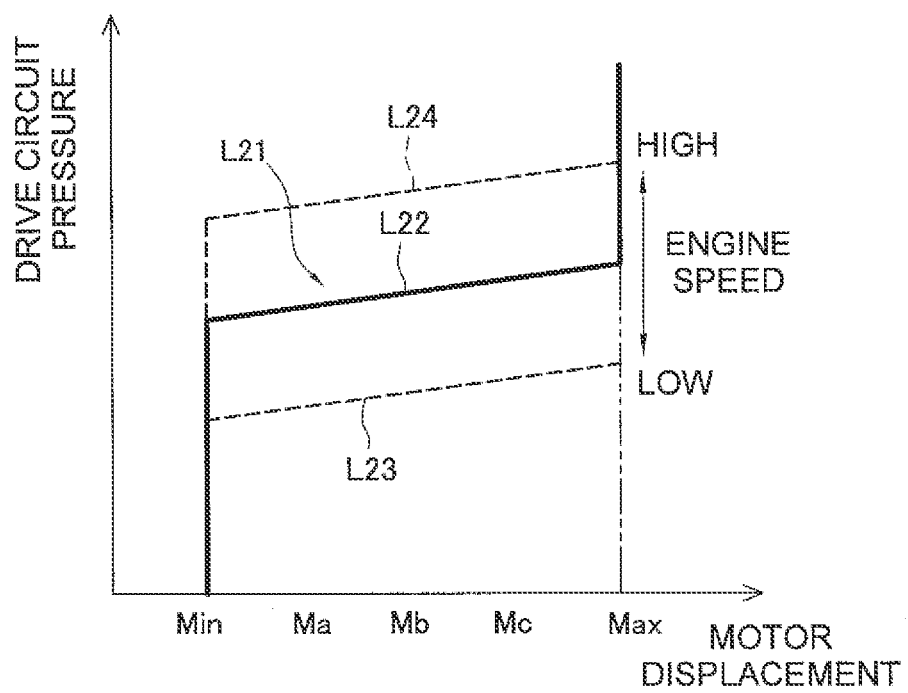
FIG. 5 is a diagram showing an example of motor displacement-drive circuit pressure characteristics.
Figure 6:
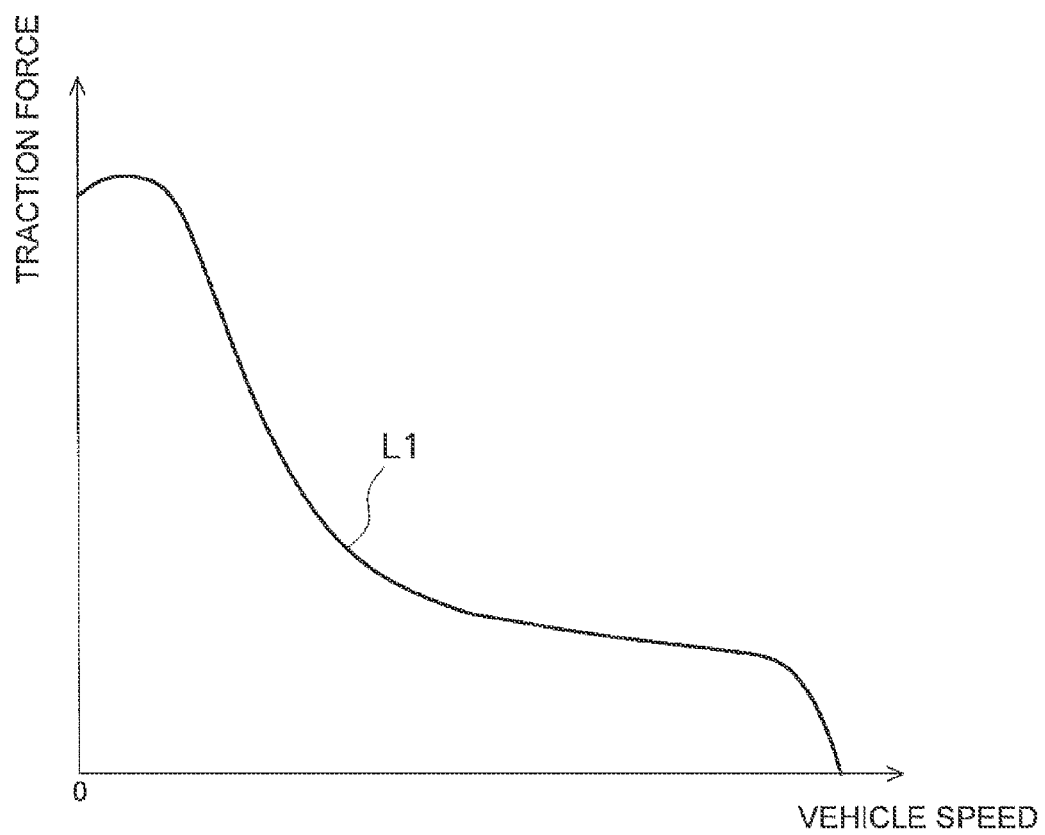
FIG. 6 is a diagram showing an example of a vehicle speed-traction force graph of a work vehicle.

FIG. 5 shows an example of motor displacement-drive circuit pressure characteristics. The solid line L21 in the drawing is a line for setting motor displacement with respect to drive circuit pressure, in a state in which engine speed is a given value. Motor displacement corresponds to the tilting angle of the traveling motion hydraulic motor 10. In a case in which the drive circuit pressure is equal to or less than a determinate value, the tilting angle is at the minimum (Min). Thereafter, the tilting angle becomes progressively larger in association with a rise in drive circuit pressure (the sloping segment L22 of the solid line). Then, once the tilting angle has reached the maximum (Max), the tilting angle is maintained at the maximum tilting angle (Max), even when the drive circuit pressure rises further. The sloping segment L22 defines a target pressure for drive circuit pressure. Specifically, when the drive circuit pressure becomes greater than the target pressure, the vehicle body controller 12 increases the motor displacement. When the drive circuit pressure becomes less than the target pressure, the motor displacement is decreased. The target pressure is set in a manner dependent on the engine speed. Specifically, the sloping segment L22 shown in FIG. 5 is established so as to ascend or descend in a manner dependent on increase and decrease in engine speed. Specifically, the sloping segment L22 is controlled in such a fashion that, when the engine speed is low, the tilting angle becomes larger starting from a lower drive circuit pressure state, and reaches the maximum tilting angle in a lower drive circuit pressure state (see the broken line sloping segment L23 at the lower side in FIG. 5). Conversely, when the engine speed is high, control takes place in such a fashion that the minimum tilting angle (Min) is maintained up to a higher drive circuit pressure, and reaches the maximum tilting angle (Max) in a higher drive circuit pressure state (see the broken line sloping segment L24 at the upper side in FIG. 5). In so doing, as shown in FIG. 6, it is possible for the work vehicle 50 to automatically change speed without an operation to change speed from a vehicle speed of zero to the maximum vehicle speed by the traction force and the vehicle speed being changed in a stepless manner.

Figure 7:
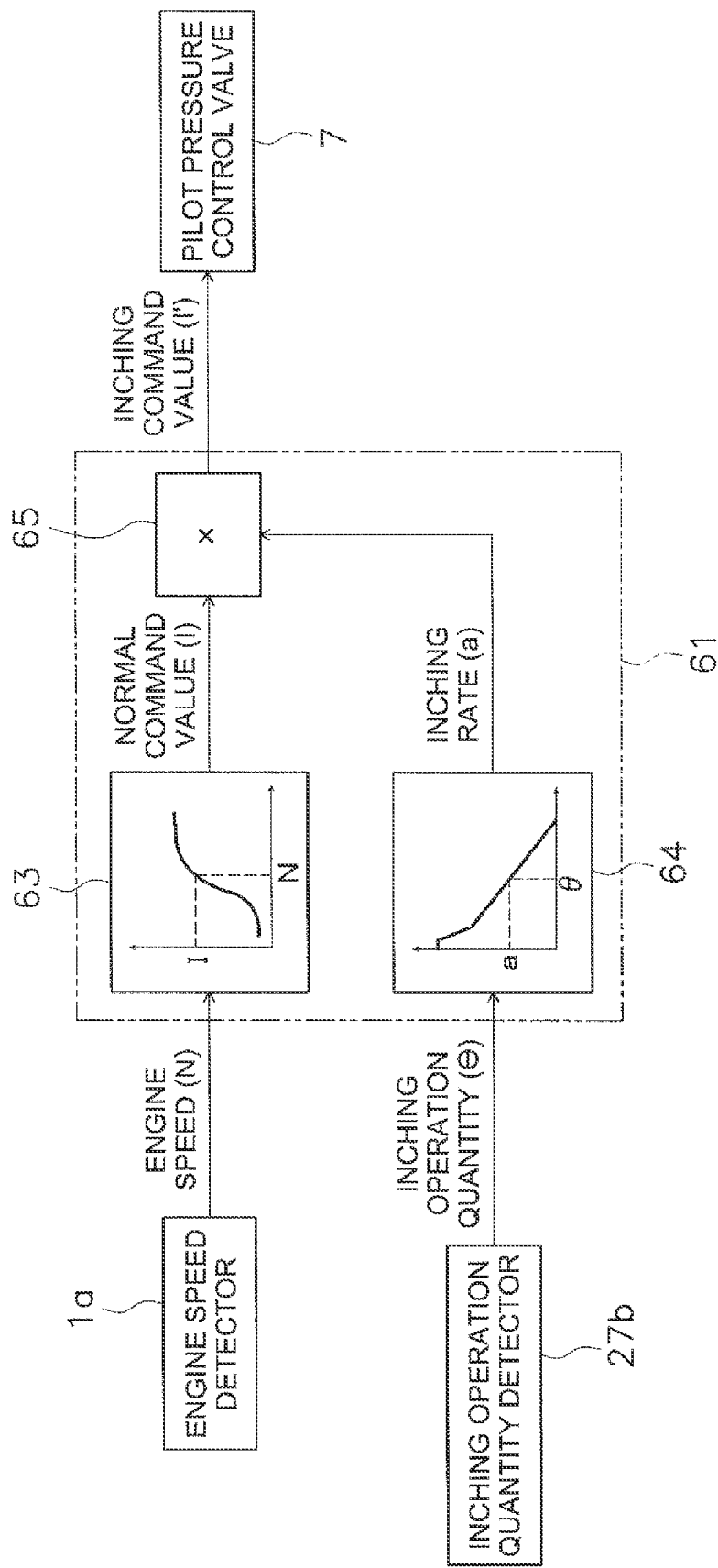
FIG. 7 is block diagram showing a process of inching control.

Inching control is described next. FIG. 7 is a block diagram showing a process of inching control performed by the computing section 61 of the vehicle body controller 12. As shown in FIG. 7, the computing section 61 includes a normal command value computing section 63, an inching characteristic value computing section 64, and an inching command value computing section 65.

The normal command value computing section 63 computes a normal command value from the engine speed detected by the engine speed detector 1a. A normal command value is a command value to the pilot pressure control valve 7 when in the normal state. The normal state is a state in which inching control is not being performed. Specifically, a normal state is a state in which the inching operation member 27a is not being operated. The normal command value computing section 63 references normal characteristic information that defines a relationship between engine speed and normal command values, and thereby computes a normal command value. The normal characteristic information is stored in the storage section 62 mentioned previously. In the normal state, the computing section 61 sends a command signal of a normal command value to the pilot pressure control valve 7. The pilot pressure control valve 7 then changes the degree of opening thereof depending on the normal command value. The pump pilot pressure is thereby controlled on the basis of the engine speed, and the pump displacement-drive circuit pressure characteristics are modified to L1 to L16, as shown in FIG. 4.

The inching characteristic value computing section 64 computes an inching rate from the inching operation quantity detected by the inching operation quantity detector 27b. The inching rate is one example of an inching characteristic value that corresponds to pilot pressure reduced through inching control. The inching rate shows the proportion of an inching command value to the normal command value. An inching command value is a command value to the pilot pressure control valve 7 during inching control. The inching rate defines lowering of pump displacement in a manner dependent on increase in the inching operation quantity. In other words, the inching rate defines lowering of the pump pilot pressure in a manner dependent on increase in the inching operation quantity. Stated in yet another way, the inching rate defines lowering of the command value to the pilot pressure control valve 7 in a manner dependent on increase in the inching operation quantity. Consequently, the inching rate becomes smaller as the inching operation quantity increases. The inching characteristic value computing section 64 computes the inching rate from the inching operation quantity by referencing inching characteristic information. The inching characteristic information defines a relationship between the inching operation quantity and the inching rate. The inching characteristic information is stored in the storage section 62. The inching characteristic information is described in detail later.

The inching command value computing section 65 computes an inching command value from the normal command value and the inching rate. Specifically, the inching command value computing section 65 multiplies the inching rate by the normal command value to compute the inching command value. The computing section 61 then sends an inching command value command signal to the pilot pressure control valve 7. By referencing the inching characteristic information during inching control in the above manner, the computing section 61 computes a command value to the pilot pressure control valve 7, based on the engine speed and the inching operation quantity.

Figure 8:
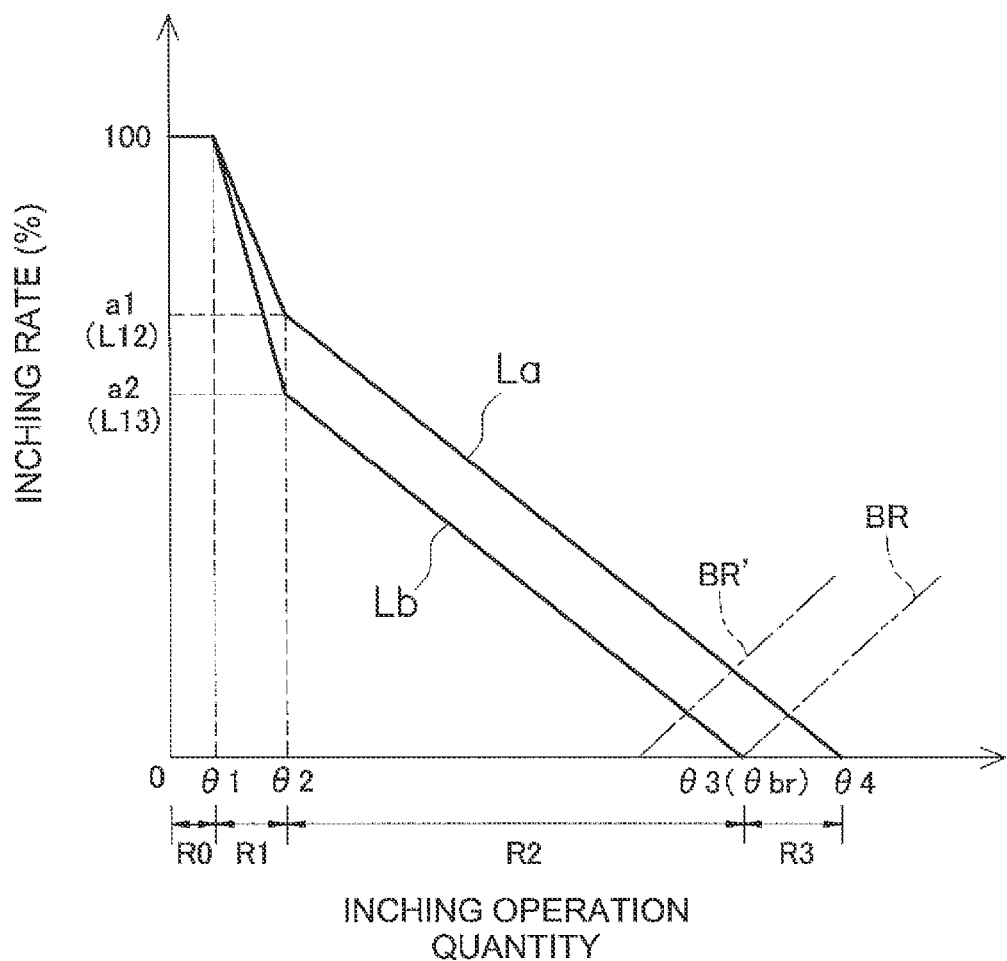
FIG. 8 is a diagram showing an example of inching characteristic information.

FIG. 8 is a diagram showing an example of inching characteristic information. As shown in FIG. 8, the inching characteristic information includes first inching characteristic information La and second inching characteristic information Lb. The inching characteristic value computing section 64 selects, on the basis of the accelerator operation quantity, either the first inching characteristic information La or the second inching characteristic information Lb. The inching characteristic value computing section 64 determines, on the basis of the accelerator operation quantity, whether the work vehicle 50 is in a state of work or a state of traveling motion. When the accelerator operation quantity is less than a predetermined value, the inching characteristic value computing section 64 determines the work vehicle 50 as being in the state of traveling motion. When the accelerator operation quantity is equal to or greater than the predetermined value, the inching characteristic value computing section 64 determines the work vehicle 50 as being in the state of work. The reason is that, when reducing the vehicle speed by inching control in the state of traveling motion, the operator either does not operate the accelerator operation member 13a, or operates it minimally. When the accelerator operation quantity is 100% in the fully open state, it is preferable for the predetermined value to be between 5% and 25% inclusive. For example, the predetermined value may be 10%. The first inching characteristic information La is referenced when the work vehicle 50 has been determined to be in the state of work. Specifically, when the accelerator operation quantity is equal to or greater than the predetermined value, the inching characteristic value computing section 64 selects the first inching characteristic information La. The second inching characteristic information Lb is referenced when the work vehicle 50 has been determined as being in the state of traveling motion. Specifically, when the accelerator operation quantity is less than the predetermined value, the inching characteristic value computing section 64 selects the second inching characteristic information Lb. The accelerator operation quantity is one example of the determination parameter of the present invention. The accelerator operation quantity detector 13 is one example of the determination parameter detector of the present invention.

As shown in FIG. 8, with the first inching characteristic information La, the inching rate is maintained at 100% for as long as the inching operation quantity is within a tolerance range R0. Specifically, with the first inching characteristic information La, reduction of pump displacement through inching control is not performed when the inching operation quantity is within the tolerance range R0. The tolerance range R0 is a range in which the inching operation quantity is 0 or greater, and less than θ1. In so doing, execution of inching control when, for example, the operator has touched the inching operation member 27a only lightly, can be prevented.

In the first inching characteristic information La, the rate at which the inching rate is lowered when the inching operation quantity is within a first range R1 is greater than the rate at which the inching rate is lowered when the inching operation quantity is within a second range R2. Specifically, in the first inching characteristic information La, the slope of the first inching characteristic information La when the inching operation quantity is within the first range R1 is steeper than the slope of the first inching characteristic information La when the inching operation quantity is within the second range R2. The first range R1 is a range that succeeds the tolerance range R0. The second range R2 is a range that succeeds the first range R1. Specifically, the second range R2 is a range in which the inching operation quantity is greater than in the first range R1. Specifically, the first range R1 is a range in which the inching operation quantity is θ1 or greater, and less than θ2. The second range R2 is a range in which the inching operation quantity is θ2 or greater, and less than θ3. In the first inching characteristic information La, when the inching operation quantity is θ2, the inching rate is a1. When the inching rate is a1, the pump displacement-drive circuit pressure characteristic is L12 shown in FIG. 4.

In the first inching characteristic information La, the rate at which the inching rate is lowered when the inching operation quantity is within a third range R3 is identical to the rate at which the inching rate is lowered when the inching operation quantity is within the second range R2. The third range R3 is a range that succeeds the second range R2. Specifically, the third range R3 is a range in which the inching operation quantity is greater than in the second range R2. The third range R3 is a range in which the inching operation quantity is θ3 or greater, and less than θ4. In the first inching characteristic information La, the inching rate reaches the minimum when the inching operation quantity is θ4. Specifically, θ4 is an example of the first inching upper limit value of the present invention.

In the first inching characteristic information La, the inching rate changes in a linear fashion with respect to change of the inching operation quantity within the first range R1. Moreover, in the first inching characteristic information La, the inching rate changes in a linear fashion with respect to change of the inching operation quantity within the second range R2 and the third range R3.

As shown in FIG. 8, the second inching characteristic information Lb defines a different relationship between the inching operation quantity and the inching rate from that of the first inching characteristic information La. Specifically, the inching rate defined by the second inching characteristic information Lb is less than the inching rate defined by the first inching characteristic information La.

Specifically, with the second inching characteristic information Lb, as with the first inching characteristic information La, the inching rate is maintained at 100% for as long as the inching operation quantity is within the tolerance range R0. Specifically, in the second inching characteristic information Lb, reduction of pump displacement through inching control is not performed when the inching operation quantity is within the tolerance range R0. Specifically, the inching operation quantity at which the inching rate begins to decline in a manner dependent on increasing inching operation quantity in the second inching characteristic information Lb is a value θ1 identical to the inching operation quantity at which the inching rate begins to decline in a manner dependent on increasing inching operation quantity in the first inching characteristic information La.

In the second inching characteristic information Lb, the rate at which the inching rate is lowered when the inching operation quantity is within the first range R1 is greater than the rate at which the inching rate is lowered when the inching operation quantity is within the second range R2. Specifically, in the second inching characteristic information Lb, the slope of the second inching characteristic information Lb when the inching operation quantity is within the first range R1 is steeper than the slope of the second inching characteristic information Lb when the inching operation quantity is within the second range R2. In the second inching characteristic information Lb, when the inching operation quantity is θ2, the inching rate is a2. The inching rate a2 when the inching operation quantity is θ2 in the second inching characteristic information Lb is less than the inching rate a1 when the inching operation quantity is θ2 in the first inching characteristic information La discussed previously. When the inching rate is a2, the pump displacement-drive circuit pressure characteristic is L13 shown in FIG. 4. In the second inching characteristic information Lb, the inching rate changes in a linear fashion with respect to change of the inching operation quantity within the first range R1. Moreover, in the second inching characteristic information Lb, the inching rate changes in a linear fashion with respect to change of the inching operation quantity within the second range R2. In the second inching characteristic information Lb, the inching rate reaches the minimum when the inching operation quantity is θ3. Specifically, θ3 is an example of the second inching upper limit value of the present invention.

In a case in which the inching operation quantity is within the first range R1, the inching rate according to the second inching characteristic information Lb is less than the inching rate according to the first inching characteristic information La. In a case in which the inching operation quantity is within the first range R1, the rate of decrease of the inching rate in the second inching characteristic information Lb is greater than the rate of decrease of the inching rate in the first inching characteristic information La. Specifically, in a case in which the inching operation quantity is within the first range R1, the slope of the second inching characteristic information Lb is steeper than the slope of the first inching characteristic information La.

In a case in which the inching operation quantity is within the second range R2, the inching rate according to the second inching characteristic information Lb is less than the inching rate according to the first inching characteristic information La. In a case in which the inching operation quantity is within the second range R2, the rate of decrease of the inching rate according to the second inching characteristic information Lb is identical to the rate of decrease of the inching rate according to the first inching characteristic information La. Specifically, in a case in which the inching operation quantity is within the second range R2, the slope of the second inching characteristic information Lb is identical in size to the slope of the first inching characteristic information La.

In FIG. 8, BR shows the change in brake pressure of the brake device 29 with respect to the inching operation quantity. The brake pressure is the pressure of the hydraulic fluid supplied to the brake device 29. The braking force of the brake device 29 increases in a manner dependent on increase in the brake pressure. As shown in FIG. 8, increase in braking force in a manner dependent on increase in the inching operation quantity is initiated at a predetermined brake-initiating operation quantity θbr. As shown in FIG. 3, the brake-initiating operation quantity θbr is less than θ4 (the first inching upper limit value). Moreover, the brake-initiating operation quantity θbr coincides with θ3 (the second inching upper limit value).

In the work vehicle 50 according to the present embodiment, the pump displacement is reduced to a larger extent when the inching operation quantity is in the first range R1 than when the inching operation quantity is in the second range R2. In so doing, the dead region of the inching operation member 27a can be smaller. Moreover, the pump displacement is reduced to a lesser extent when the inching operation quantity is in the second range R2 than when the inching operation quantity is in the first range R1. Lowering of the operation performance of the inching operation member can be curtailed thereby.

When the accelerator operation quantity is equal to or greater than a predetermined value, the first inching characteristic information La is referenced. Specifically, when the work vehicle 50 is in the state of work, the first inching characteristic information La is referenced. When the accelerator operation quantity is less than the predetermined value, the second inching characteristic information Lb is referenced. Specifically, when the work vehicle 50 is in the state of traveling motion, the second inching characteristic information Lb is referenced. Therefore, the pump displacement is reduced to a larger extent when the work vehicle 50 is in the state of traveling motion than when in the state of work. During traveling motion, the vehicle speed can thereby be reduced rapidly through inching control. Moreover, excessive reduction of pump displacement during work can be curtailed.

Typically, the traveling motion load in the state of traveling motion is less than the traveling motion load in the state of work. For example, assume that, as shown in FIG. 4, the drive circuit pressure is P1 when the work vehicle 50 is in the state of work. Further assume that when the work vehicle 50 is in the state of traveling motion, the drive circuit pressure is P2. P2 is less than P1. With the work vehicle 50 in the state of work, the inching rate is established at a1 when the operator operates the inching operation member 27a to θ2. The pump displacement-drive circuit pressure characteristics thereby change from L11 to L12. Consequently, when the operator operates the inching operation member 27a during traveling motion, deceleration through inching control begins to take effect from the point in time that the inching operation quantity reaches θ2. On the other hand, with the work vehicle 50 in the state of traveling motion, the inching rate is established at a2 when the operator operates the inching operation member 27a to θ2. The pump displacement-drive circuit pressure characteristics thereby change from L11 to L13. Consequently, deceleration through inching control begins to take effect from the point in time that the inching operation quantity reaches θ2. Through selection of inching characteristic information in a manner dependent on the state of the work vehicle 50 in this fashion, the dead region of the inching operation member 27a can be smaller, regardless of whether the work vehicle 50 is in the state of traveling motion or in the state of work.

As shown in FIG. 8, in both the first inching characteristic information La and the second inching characteristic information Lb, the inching rate begins to be lowered from the time that the inching operation quantity has reached an identical value of θ1. Specifically, with the state of the work vehicle 50 being either the state of traveling motion or the state of work, the pump displacement begins to be lowered from the time that the inching operation quantity has reached an identical value of θ1. Consequently, the feel of operation of the inching member is identical both during travel motion and during work, and the operation performance can be improved.

During work, braking by the brake device 29 is initiated before the inching operation quantity reaches θ4. Consequently, a state in which braking force is being generated by the brake device 29 occurs in a state in which traction force is being weakened through operation of the inching operation member 27a. Therefore, backward thrusting of the work vehicle 50 due to weakened traction force can be prevented.

During traveling motion, braking force begins to be generated by the brake device 29 when the inching operation quantity reaches θ3. Therefore, backward thrusting of the work vehicle 50 during uphill traveling motion, for example, can be prevented. Moreover, as compared with the case in which the brake-initiating operation quantity is less than θ3 (see BR' shown in FIG. 8), it is possible to reduce the range of inching operation quantities within which deceleration by inching control and braking force by the brake device 29 are employed concomitantly during work. Specifically, it is possible to reduce the range of inching operation quantities within which traveling motion at low speed takes place through inching control in a state in which braking force is generated by the brake device 29. In so doing, energy loss can be reduced.

Figure 9:
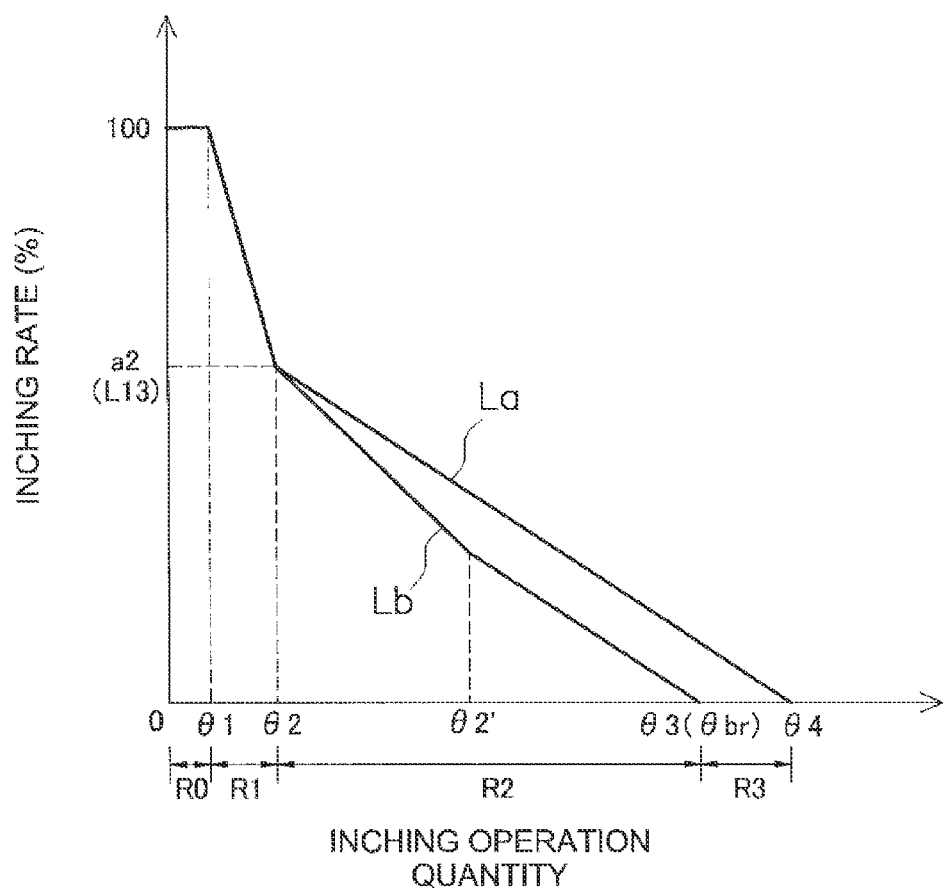
FIG. 9 is a diagram showing an example of inching characteristic information according to a first modification example.

While the present invention has been described above in terms of the presently preferred embodiment, the present invention is not limited to the aforedescribed embodiment, and various modifications are possible within the scope of the spirit of the invention. FIG. 9 shows an example of inching characteristic information according to a first modification example. In the first modification example, within the first range R1, the inching rate defined by the second inching characteristic information Lb is identical to the inching rate defined by the first inching characteristic information La, as shown in FIG. 9. Specifically, within the first range R1, the rate of reduction of the inching rate of the first inching characteristic information La and the rate of reduction of the inching rate of the second inching characteristic information Lb are identical. The dead region of the inching operation member 27a during work can thereby be made even smaller. However, in the second range R2, the inching rate defined by the second inching characteristic information Lb is less than the inching rate defined by the first inching characteristic information La. Vehicle speed can thereby be rapidly reduced by inching control during traveling motion.

In the first modification example, the rate of reduction of the inching rate of the second inching characteristic information Lb changes within the second range R2. Specifically, in the second range R2, the rate of reduction of the inching rate when the inching operation quantity is small (a range of θ2 or greater but less than θ2') is greater than the rate of reduction of the inching rate when the inching operation quantity is large (a range of θ2' or greater but less than θ3). Accordingly the effect of deceleration by inching control during traveling motion can be obtained quickly.

While not illustrated in FIG. 9, it is also acceptable for the rate of reduction of the inching rate of the first inching characteristic information La to change in the second range R2. Alternatively, the first inching characteristic information La may be represented by a curve. The second inching characteristic information La may be represented by a curve.

Figure 10:
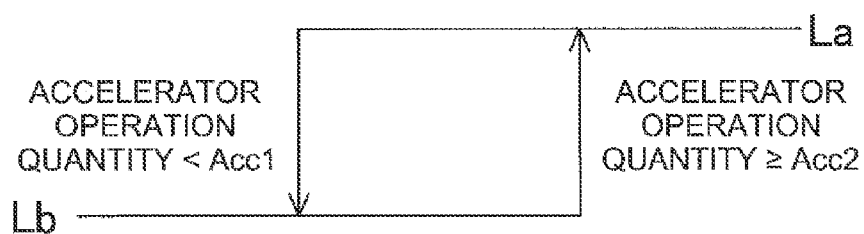
FIG. 10 is a diagram showing a method for selecting inching characteristic information according to a second modification example.

FIG. 10 shows a method for selecting inching characteristic information according to a second modification example. In the second modification example, the inching characteristic value computing section 64 references the second inching characteristic information Lb when the accelerator operation quantity is less than a first value Acc1, as shown in FIG. 10.

When the accelerator operation quantity is equal to or greater than a second value Acc2, the inching characteristic value computing section 64 references the first inching characteristic information La. The second value Acc2 is greater than the first value Acc1. When the accelerator operation quantity is equal to or greater than the first value Acc1 but less than the second value Acc2, the current inching characteristic information is maintained.

In the second modification example, hysteresis is introduced into the determination to select the first inching characteristic information La or the second inching characteristic information Lb. Repeated switching between the first inching characteristic information La and the second inching characteristic information within a brief time span can thereby be prevented.

Figure 11:
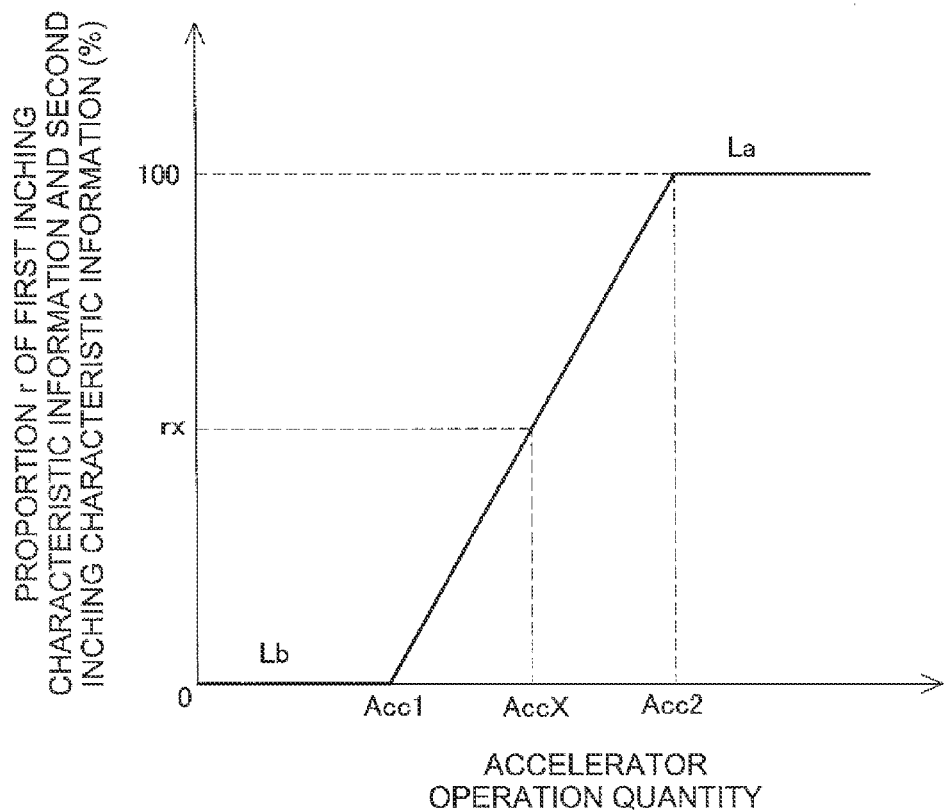
FIG. 11 is a diagram showing a method for selecting inching characteristic information according to a third modification example.

FIG. 11 shows a method for selecting inching characteristic information according to a third modification example. The vertical axis in FIG. 11 shows proportions of the first inching characteristic information La and of the second inching characteristic information Lb during computation of inching characteristic information by interpolation from the first inching characteristic information La and the second inching characteristic information Lb. Specifically, the proportion r on the vertical axis shows the proportion of the first inching characteristic information La. Consequently, when the proportion r is 100%, this means that the first inching characteristic information La is selected. When the proportion r is 0%, this means that the second inching characteristic information Lb is selected. In the third modification example, the proportion r is 0% when the accelerator operation quantity is less than a first value Acc1, as shown in FIG. 11. Consequently, when the accelerator operation quantity is less than the first value Acc1, the inching characteristic value computing section 64 references the second inching characteristic information Lb. When the accelerator operation quantity is equal to or greater than a second value Acc2, the proportion r is 100%. Consequently, when the accelerator operation quantity is equal to or greater than the second value Acc2, the inching characteristic value computing section 64 references the first inching characteristic information La. The second value Acc2 is greater than the first value Acc1. When the accelerator operation quantity is equal to or greater than the first value Acc1 but less than the second value Acc2, the inching characteristic value computing section 64 computes an inching rate by interpolation from the first inching characteristic information La and the second inching characteristic information Lb. As shown in FIG. 11, when the accelerator operation quantity is equal to or greater than the first value Acc1 but less than the second value Acc2, the proportion r increases in linear fashion with respect to increase of the accelerator operation quantity. Consequently, when the accelerator operation quantity is equal to or greater than the first value Acc1 but less than the second value Acc2, the inching characteristic value computing section 64 computes an inching rate by linear interpolation from the first inching characteristic information La and the second inching characteristic information Lb. For example, when the accelerator operation quantity is AccX, the proportion r is rx. Acc1<AccX<Acc2. Also, 0<rx<100. In this case, the inching characteristic information will be a value that combines rx % of the first inching characteristic information La and (100−rx) % of the second inching characteristic information Lb. For example, where, at a given inching operation quantity, the inching rate according to the first inching characteristic information La is a1 and the inching rate according to the second inching characteristic information Lb is a2. the inching operation quantity "a" at this time will be a value that is the sum of rx % of a1 and (100−rx) % of a2.

In the third modification example, pump displacement is reduced on the basis of intermediate inching characteristic information between the first inching characteristic information La and the second inching characteristic information Lb, in a manner dependent on the accelerator operation quantity. The pump displacement can thereby be reduced in more appropriate fashion, depending on the state of the work vehicle 50.

In the aforedescribed embodiment and modification examples, the accelerator operation quantity is employed as the determination parameter, however a parameter other than the accelerator operation quantity may be employed. For example, vehicle speed may be employed as the determination parameter. In this case, when the vehicle speed is less than a predetermined value, the first inching characteristic information La is referenced. When the vehicle speed is equal to or greater than the predetermined value, the second inching characteristic information Lb is referenced. The reason is that, ordinarily, the vehicle speed during traveling motion is greater than the vehicle speed during work. The predetermined vehicle speed is preferably 2 to 5 km/h inclusive, for example.

Figure 12:
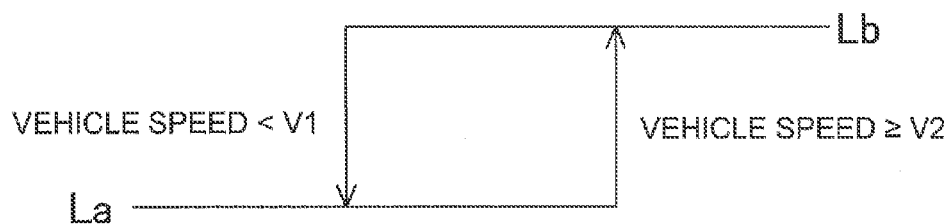
FIG. 12 is a diagram showing a method for selecting inching characteristic information according to a fourth modification example.

FIG. 12 shows a method for selecting inching characteristic information according to a fourth modification example. In the fourth modification example, the inching characteristic value computing section 64 references the first inching characteristic information La when the vehicle speed is less than a first value V1, as shown in FIG. 12. When the vehicle speed is equal to or greater than a second value V2, the inching characteristic value computing section 64 references the second inching characteristic information Lb. The second value V2 is greater than the first value V1. When the accelerator operation quantity is equal to or greater than the first value V1 but less than the second value V2, the current inching characteristic information is maintained.

In the fourth modification example, as in the second modification example, hysteresis is introduced into the determination to select the first inching characteristic information La or the second inching characteristic information Lb. Repeated switching between the first inching characteristic information La and the second inching characteristic information within a brief time span can thereby be prevented.

Figure 13:
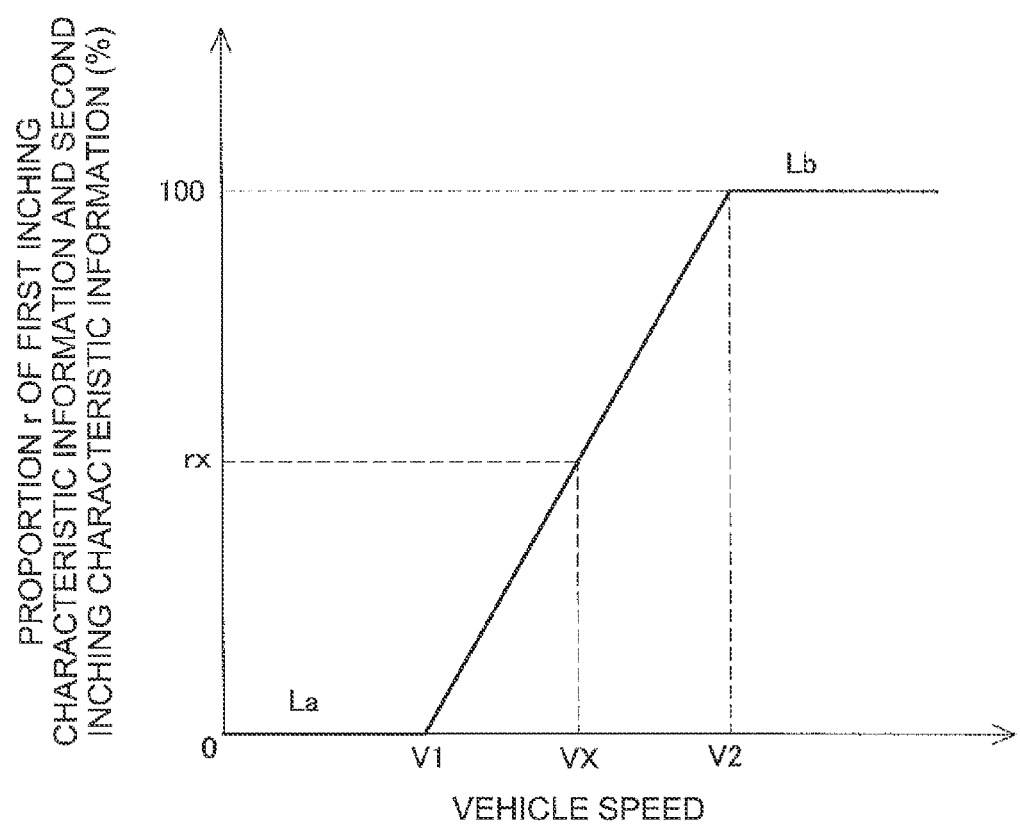
FIG. 13 is a diagram showing a method for selecting inching characteristic information according to a fifth modification example.

FIG. 13 shows a method for selecting inching characteristic information according to a fifth modification example. The vertical axis in FIG. 13, like the vertical axis in FIG. 11, shows proportions of the first inching characteristic information La and of the second inching characteristic information Lb during computation of inching characteristic information by interpolation from the first inching characteristic information La and the second inching characteristic information Lb. Specifically, the proportion r on the vertical axis shows the proportion of the second inching characteristic information Lb. In the fifth modification example, when the vehicle speed is less than the first value V1, the proportion r is 0%, as shown in FIG. 13. Consequently, when the vehicle speed is less than the first value V1, the inching characteristic value computing section 64 references the first inching characteristic information La. When the vehicle speed is equal to or greater than the second value V2, the proportion r is 100%. Consequently, when the vehicle speed is equal to or greater than the second value V2, the inching characteristic value computing section 64 references the second inching characteristic information Lb. The second value V2 is greater than the first value V1. When the vehicle speed is equal to or greater than the first value V1 but less than the second value V2, the inching characteristic value computing section 64 computes an inching rate by interpolation from the first inching characteristic information La and the second inching characteristic information Lb. As shown in FIG. 13, when the vehicle speed is equal to or greater than the first value V1 but less than the second value V2, the proportion r increases in linear fashion with respect to increase in vehicle speed. Consequently, when the vehicle speed is equal to or greater than the first value V1 but less than the second value V2, the inching characteristic value computing section 64 computes an inching rate by linear interpolation from the first inching characteristic information La and the second inching characteristic information Lb. For example, when the vehicle speed is VX, the proportion r is rx. V1<VX<V2. Also, 0<rx<100. In this case, the inching characteristic information will be a value that combines rx % of the second inching characteristic information Lb and (100−rx) % of the first inching characteristic information La. For example, where, at a given inching operation quantity, the inching rate according to the first inching characteristic information La is a 11, and the inching rate according to the second inching characteristic information Lb is a2, the inching operation quantity "a" at this time will be a value that is the sum of (100−rx) % of a1 and rx % of a2.

In the fifth modification example, pump displacement is reduced on the basis of intermediate inching characteristic information between the first inching characteristic information La and the second inching characteristic information Lb, in a manner dependent on the vehicle speed. The pump displacement can thereby be reduced in more appropriate fashion, depending on the state of the work vehicle 50.

In the aforedescribed embodiment and modification examples, the accelerator operation quantity or vehicle speed is employed as the determination parameter; however the drive circuit pressure may also be employed as the determination parameter. Alternatively, the operation quantity of the work implement operation member 23 may be employed as the determination parameter. A combination of some of or all of these plurality of parameters may be employed as determination parameters.

In the aforedescribed embodiment, a wheel loader is shown by way of example of the work vehicle 50, but some other work vehicle equipped with an HST would be acceptable as well.

In the aforedescribed embodiment, the work vehicle 50 equipped with a 1-pump, 1-motor HST system including a single hydraulic pump and a traveling motion hydraulic motor 10 is described by way of example. However, the present invention is not limited thereto. For example, the present invention could be implemented in a work vehicle equipped with a 1-pump, 2-motor HST system including a single hydraulic pump and two traveling motion hydraulic motors.

In the aforedescribed embodiment, the inching operation member 27a also functions as the brake pedal. However, the inching operation member 27a may be furnished as a separate member from the brake pedal.

In the aforedescribed embodiment, the first inching characteristic information La and the second inching characteristic information Lb are referenced selectively. However, provided that the inching characteristic information defines a relationship between inching operation quantity and inching rate in a manner dependent upon a determination parameter, there is no limit as to the format thereof. For example, the inching characteristic information could be a map defined by a determination parameter, the inching operation quantity, and the inching rate.

In the aforedescribed embodiment, the inching rate is employed as the inching characteristic value. However, the inching characteristic value could be a parameter corresponding to the pump pilot pressure, which is reduced by inching control. For example, the upper limit value of the command value presented to the pilot control valve 7 could be employed as the inching characteristic value. Specifically, the inching characteristic information may be one that defines the inching operation quantity, and an upper limit value of the command value presented to the pilot control valve 7 (hereinafter termed "command upper limit value"). In this case, the above-mentioned inching characteristic value computing section 64 would reference the inching characteristic information to thereby compute the command upper limit value from the inching operation quantity. The inching command value computing section 65 would then determine the lesser of the normal command value and the command upper limit value, to be the inching command value.

In the aforedescribed embodiment, the brake-initiating operation quantity Obr coincides with θ3 (the second inching upper limit value). However, the brake-initiating operation quantity θbr could be less than θ3 (the second inching upper limit value). However, from the standpoint of reducing energy loss, it is preferable for the brake-initiating operation quantity Obr to coincide with θ3 (the second inching upper limit value), as in the aforedescribed embodiment.

According to the illustrated embodiments, there can be offered a work vehicle and a control method for a work vehicle, whereby the dead region of an inching operation member can be made smaller, while also curtailing lowering of the operation performance of the inching operation member.

The invention claimed is:
1. A work vehicle, comprising:
an engine;
a hydraulic pump driven by the engine;
a traveling motion hydraulic motor driven by hydraulic fluid discharged from the hydraulic pump;
a pump displacement control cylinder configured to change a pump displacement of the hydraulic pump by changing a tilting angle of the hydraulic pump;
a pilot hydraulic pressure source configured to supply hydraulic fluid for driving the pump displacement control cylinder;
a pilot pressure control valve configured to control a pilot pressure, which is a pressure of the hydraulic fluid supplied to the pump displacement control cylinder from the pilot hydraulic pressure source;
an inching operation member configured to be operated in order to indicate execution of inching control to bring about a reduction in the pump displacement by reducing the pilot pressure;
an inching operation quantity detector configured to detect an inching operation quantity which is an operation quantity of the inching operation member;
a determination parameter detector configured to detect a determination parameter for determining whether the vehicle is in a state of work or a state of traveling motion;
a storage section configured to store inching characteristic information defining a relationship between the inching operation quantity, and an inching characteristic value corresponding to the pilot pressure which is reduced through the inching control; and
a computing section configured to reference the inching characteristic information to thereby compute, from the inching operation quantity detected by the inching operation quantity detector, a command value to the pilot pressure control valve, wherein the inching characteristic information defines a relationship between the inching operation quantity and the inching characteristic value, in a manner dependent on the determination parameter, and in the inching characteristic information, a rate of lowering the inching characteristic value when the inching operation quantity is within a first range is greater than a rate of lowering the inching characteristic value when the inching operation quantity is within a second range greater than the first range.

2. The work vehicle according to claim 1, wherein the computing section is configured to determine whether the vehicle is in the state of work or the state of traveling motion based on the determination parameter;

the inching characteristic information includes first inching characteristic information that is referenced when the vehicle is determined to be in the state of work, and second inching characteristic information that is referenced when the vehicle is determined to be in the state of traveling motion; and the second inching characteristic information defines a different relationship between the inching operation quantity and the inching characteristic value from that of the first inching characteristic information.

3. The work vehicle according to claim 2, wherein the inching characteristic value defined by the second inching characteristic information is less than the inching characteristic value defined by the first inching characteristic information.

4. The work vehicle according to claim 2, wherein within the first range, the inching characteristic value defined by the second inching characteristic information is identical to the inching characteristic value defined by the first inching characteristic information; and in the second range, the inching characteristic value defined by the second inching characteristic information is less than the inching characteristic value defined by the first inching characteristic information.

5. The work vehicle according to claim 2, wherein the inching operation quantity at which the inching characteristic value begins to decrease in a manner dependent on increase in the inching operation quantity in the second inching characteristic information is identical to the inching operation quantity at which the inching characteristic value begins to decrease in a manner dependent on increase in the inching operation quantity in the first inching characteristic information.

6. The work vehicle according to claim 2, further comprising a brake device for braking the vehicle, wherein the inching operation member also serves as an operation member of the brake device;

the brake device is configured such that an increase in braking force in a manner dependent on increase in the inching operation quantity is initiated at a predetermined brake-initiating operation quantity;

in the first inching characteristic information, the inching characteristic value reaches a minimum value when the inching operation quantity equals a first inching upper limit value;

in the second inching characteristic information, the inching characteristic value reaches a minimum value when the inching operation quantity equals a second inching upper limit value that is less than the first inching upper limit value; and the brake-initiating operation quantity is at least less than the first inching upper limit value.

7. The work vehicle according to claim 6, wherein the brake-initiating operation quantity coincides with the second inching upper limit value.

8. The work vehicle according to claim 2, further comprising an accelerator operation member for setting a target rotation speed of the engine; wherein the determination parameter is an operation quantity of the accelerator operation member; and the computing section is configured to reference the second inching characteristic information when the operation quantity of the accelerator operation member is less than a predetermined value, and to reference the first inching characteristic information when the operation quantity of the accelerator operation member is equal to or greater than the predetermined value.

9. The work vehicle according to claim 2, further comprising an accelerator operation member for setting a target rotation speed of the engine, wherein the determination parameter is an operation quantity of the accelerator operation member; and the computing section is configured to reference the second inching characteristic information when the operation quantity of the accelerator operation member is less than a first value, to reference the first inching characteristic information when the operation quantity of the accelerator operation member is equal to or greater than a second value that is greater than the first value, and to maintain the current inching characteristic information when the operation quantity of the accelerator operation member is equal to or greater than the first value but less than the second value.

10. The work vehicle according to claim 2, wherein the computing section is configured to reference the second inching characteristic information when the operation quantity of the accelerator operation member is less than a first value, to reference the first inching characteristic information when the operation quantity of the accelerator operation member is equal to or greater than a second value that is greater than the first value, and to compute the inching characteristic value by interpolating from the first inching characteristic information and the second inching characteristic information when the operation quantity of the accelerator operation member is equal to or greater than the first value but less than the second value.

11. The work vehicle according to claim 2, wherein the determination parameter is a vehicle speed; and the computing section is configured to reference the first inching characteristic information when the vehicle speed is less than a predetermined value, and to reference the second inching characteristic information when the vehicle speed is equal to or greater than the predetermined value.

12. The work vehicle according to claim 2, wherein the determination parameter is a vehicle speed; and the computing section is configured to reference the first inching characteristic information when the vehicle speed is less than a first value, to reference the second inching characteristic information when the vehicle speed is equal to or greater than a second value that is greater than the first value, and to maintain the current inching characteristic information when the vehicle speed is equal to or greater than the first value but less than the second value.

13. The work vehicle according to claim 2, wherein the computing section is configured to reference the first inching characteristic information when the vehicle speed is less than a first value, to reference the second inching characteristic information when the vehicle speed is equal to or greater than a second value that is greater than the first value, and to compute the inching characteristic value by interpolating from the first inching characteristic information and the second inching characteristic information when the vehicle speed is equal to or greater than the first value but less than the second value.

14. The work vehicle according to claim 1, further comprising
an accelerator operation member for setting a target engine speed; wherein
the determination parameter includes at least the operation quantity of the accelerator operation member.

15. The work vehicle according to claim 1, wherein the determination parameter includes at least a vehicle speed.

16. A control method for a work vehicle including:
an engine;
a hydraulic pump driven by the engine;
a traveling motion hydraulic motor driven by hydraulic fluid discharged from the hydraulic pump;
a pump displacement control cylinder configured to change a pump displacement of the hydraulic pump by changing a tilting angle of the hydraulic pump;
a pilot hydraulic pressure source configured to supply hydraulic fluid for driving the pump displacement control cylinder;
a pilot pressure control valve configured to control a pilot pressure, which is a pressure of the hydraulic fluid supplied to the pump displacement control cylinder from the pilot hydraulic pressure source; and
an inching operation member configured to be operated in order to indicate execution of inching control to bring about a reduction in the pump displacement by reducing the pilot pressure;
the control method comprising:
detecting an inching operation quantity which is an operation quantity of the inching operation member;
detecting an determination parameter for determining whether the vehicle is in a state of work or a state of traveling motion; and
computing a command value to the pilot pressure control valve based on the detected inching operation quantity through referencing of inching characteristic information that defines a relationship between the inching operation quantity, and an inching characteristic value corresponding to the pilot pressure which is reduced through the inching control, wherein
the inching characteristic information defines a relationship between the inching operation quantity and the inching characteristic value, in a manner dependent on the determination parameter, and
in the inching characteristic information, a rate of lowering the inching characteristic value when the inching operation quantity is within a first range is greater than a rate of lowering the inching characteristic value when the inching operation quantity is within a second range greater than the first range.

* * * * *